(12) United States Patent
Gamache

(10) Patent No.: US 9,897,218 B2
(45) Date of Patent: Feb. 20, 2018

(54) BALL VALVE WITH LOAD VARYING MECHANISM, AND METHOD OF OPERATING THE SAME

(71) Applicant: MECANIQUE ANALYTIQUE INC., Thetford-Mines (CA)

(72) Inventor: Yves Gamache, Thetford-Mines (CA)

(73) Assignee: MECANIQUE ANALYTIQUE INC., Thetford-Mines (CA)

( * ) Notice: Subject to any disclaimer, the term of this patent is extended or adjusted under 35 U.S.C. 154(b) by 8 days.

(21) Appl. No.: 15/116,086

(22) PCT Filed: Feb. 5, 2015

(86) PCT No.: PCT/CA2015/050086
§ 371 (c)(1),
(2) Date: Aug. 2, 2016

(87) PCT Pub. No.: WO2015/117242
PCT Pub. Date: Aug. 13, 2015

(65) Prior Publication Data
US 2017/0167616 A1    Jun. 15, 2017

Related U.S. Application Data

(60) Provisional application No. 61/936,098, filed on Feb. 5, 2014.

(51) Int. Cl.
*F16K 5/06* (2006.01)
*F16K 5/20* (2006.01)
(Continued)

(52) U.S. Cl.
CPC ............ *F16K 5/201* (2013.01); *F16K 5/0636* (2013.01); *F16K 5/14* (2013.01); *F16K 27/067* (2013.01);
(Continued)

(58) Field of Classification Search
CPC .. F16K 5/201; F16K 27/067; F16K 31/52458; F16K 5/14; F16K 5/0636; Y10T 137/0508
(Continued)

(56) References Cited

U.S. PATENT DOCUMENTS 1,985,449 A * 12/1934 Heggem ................ F16K 5/184
116/277
3,157,190 A    11/1964 Allen
(Continued)

FOREIGN PATENT DOCUMENTS

EP          2341269 A1    6/2011

*Primary Examiner* — John Bastianelli
(74) *Attorney, Agent, or Firm* — Price Heneveld LLP

(57) ABSTRACT

A ball valve is provided. The ball valve includes at least one load varying mechanism provided in the static body assembly. The load varying mechanism includes a biasing member pressing one of the ball seat seals against the outer surface of the ball of the ball valve with a variable sealing load force applied on the ball, toward the ball and coaxial with the direction of the fluid. The load varying mechanism also includes a movable member operatively connected to a cam and to the biasing member, a rotation of the cam translating the movable member coaxially to the direction of the fluid, in order to variably load the biasing member toward or away from the ball, based on the different positions of the ball.

27 Claims, 18 Drawing Sheets

(51) Int. Cl.
*F16K 31/524* (2006.01)
*F16K 27/06* (2006.01)
*F16K 5/14* (2006.01)

(52) U.S. Cl.
CPC ... *F16K 31/52458* (2013.01); *Y10T 137/0508* (2015.04)

(58) Field of Classification Search
USPC .......... 137/15.22; 251/163, 174, 180, 315.12
See application file for complete search history.

(56) References Cited

U.S. PATENT DOCUMENTS

| | | | |
|---|---|---|---|
| 3,245,653 A * | 4/1966 | Lavigueur | F16K 5/201 137/243.3 |
| 3,746,302 A * | 7/1973 | Larsen | F16K 5/185 251/103 |
| 4,175,577 A * | 11/1979 | Kacal | F16K 5/0636 137/15.22 |
| 4,206,903 A * | 6/1980 | Scaramucci | F16K 1/2261 137/614.11 |
| 4,262,691 A * | 4/1981 | Kacal | F16K 5/0626 137/315.21 |
| 4,266,566 A | 5/1981 | Kacal et al. | |
| 4,867,414 A | 9/1989 | Hubacek | |
| 5,117,858 A | 6/1992 | Osthues et al. | |
| 5,735,047 A | 4/1998 | Evans et al. | |
| 6,378,841 B1 | 4/2002 | Russell | |
| 6,681,793 B2 * | 1/2004 | Mike | F16K 5/0636 137/15.22 |
| 7,484,710 B2 * | 2/2009 | Koester | F16K 5/0678 251/160 |
| 8,490,945 B2 | 7/2013 | Keeper et al. | |
| 2010/0090146 A1 | 4/2010 | Keeper et al. | |
| 2010/0200078 A1 | 8/2010 | Timko et al. | |

* cited by examiner

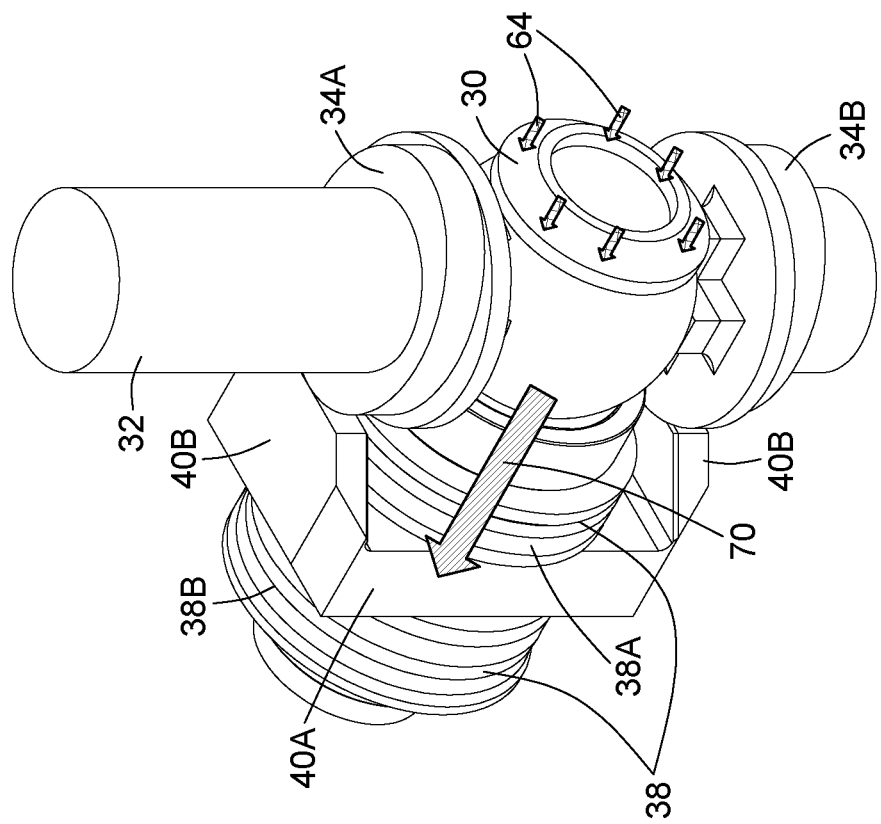
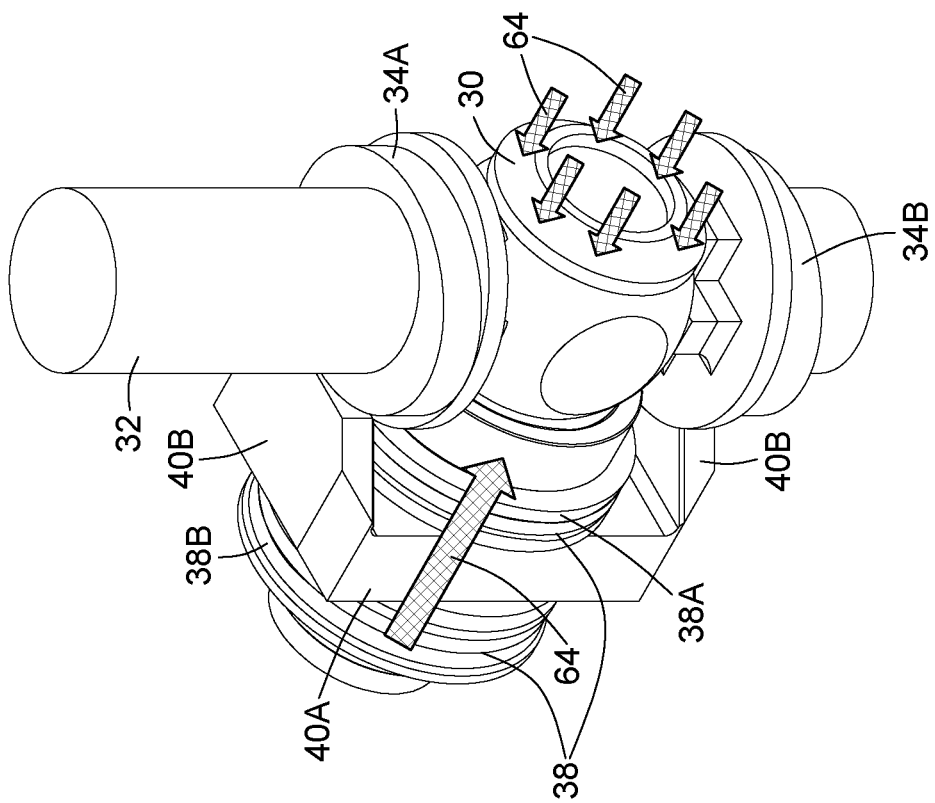
FIG. 5A
FIG. 5B

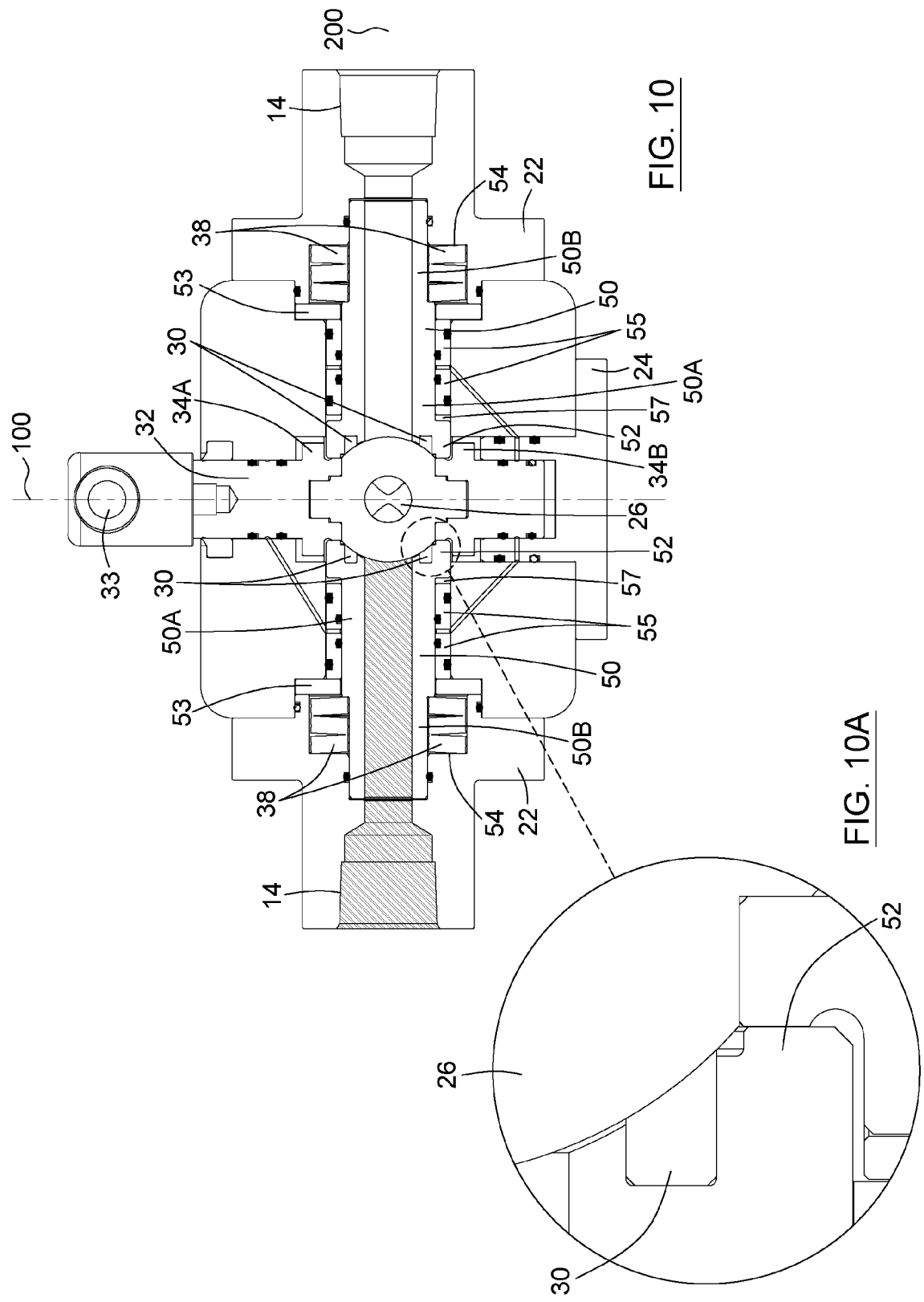

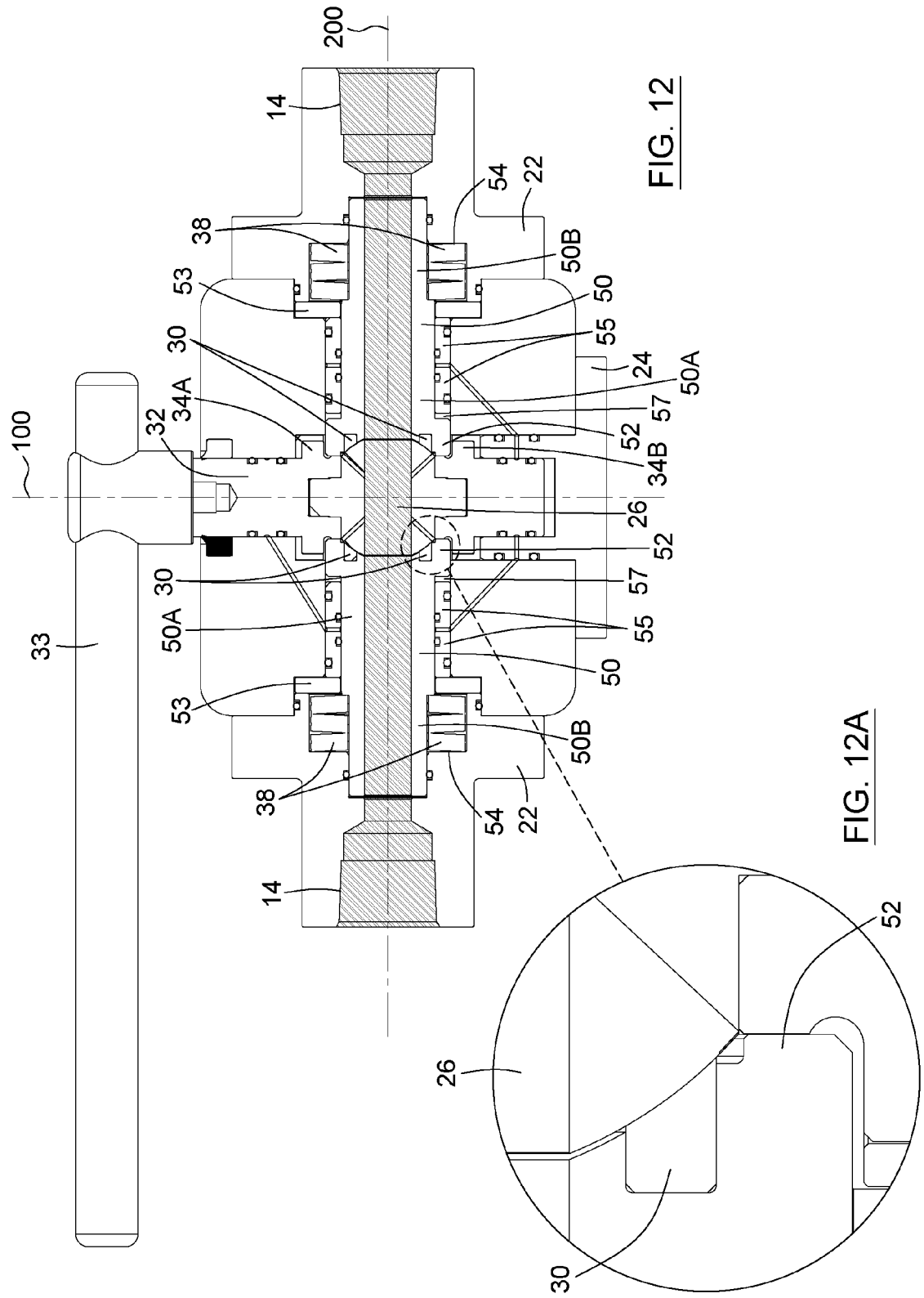

BALL VALVE WITH LOAD VARYING MECHANISM, AND METHOD OF OPERATING THE SAME

TECHNICAL FIELD

The technical field generally concerns systems and methods related to valves, and more particularly to a ball valve with a load varying mechanism and a method for reducing friction during movement of the ball.

BACKGROUND

The sealing of ball valves (i.e. the leak integrity) is usually provided by applying a load on the ball, such required load being greater for higher pressure operations. The load is normally set by a mechanical biasing element, typically a coil spring. Since the force maintaining the ball in a fixed position is relatively high, such valves are subject to high friction and wear. Wear occurs when the ball is repeatedly turned while being pressed against the housing or packing of the valve, which results in scratches appearing on the ball, reducing the valve's lifetime.

Friction causes particles to be generated, which further increase problems associated with wear. Leaks are likely to appear, and eventually, the valve will have to be repaired or replaced. This problem may be found in most ball valves available. Referring to U.S. Pat. No. 4,867,414, there is shown a ball valve having retractable floating valve seats to facilitate inspection and maintenance of the valve. In such a valve, a mechanism to replace the worn parts is provided, but the problems associated with wear are still present.

Another problem arises from the fact that valves are usually tuned at ambient temperature, but are mostly used at different temperatures, from cryogenic temperatures to temperatures of around 350° C. The behavior of each part of the valve may therefore differ greatly depending on the temperature range at which it is operated. Consequently, a valve can work perfectly when tuned and operated at ambient temperature, but important leakage may occur when the valve is used in a system operated at a different temperature.

In light of the above, there is a need for an improved valve, or an improved system for reducing wear and friction on the ball of a ball valve during movement of the ball. There is also a need for a method of operating a valve that would help reduce friction between the ball and the stationary body assembly of the valve.

SUMMARY

There is therefore a need to address at least one of the above mentioned issues.

In one aspect, a ball valve is provided. The ball valve includes a static body assembly provided with fluid passages for circulating fluid therein in a direction at a fluid pressure, the static body assembly having a cavity, the fluid passages having respective ports opening in said cavity; a ball having a through channel and an outer surface, the ball being mounted within the cavity and being rotatable about an axis of rotation orthogonal to said direction of the fluid, between a closed position and an open position so as to obstruct or permit communication between the fluid passages via the through channel; ball seat seals interfacing with the outer surface of the ball, each one of the ball seat seals being provided between the ball and the static body assembly, and surrounding a respective one of the ports; an actuating mechanism operatively connected to the ball for moving the ball between the open and closed positions; a cam operatively connected to the actuating mechanism and rotatable therewith; and at least one load varying mechanism provided in the static body assembly, including: a biasing member pressing one of the ball seat seals against the outer surface of the ball with a variable sealing load force applied on the ball, toward the ball and coaxial with said direction; and a movable member operatively connected to the cam and to the biasing member, a rotation of the cam translating the movable member coaxially to said direction, variably loading the biasing member toward or away from the ball, based on the different positions of the ball.

In some embodiments, the biasing member includes at least one spring assembly provided around one of the fluid passages.

In some embodiments, the ball valve includes tubular members defining at least partially the respective the fluid passages, the tubular members having respective opposite inner and outer ends, the inner ends facing the ball, at least one of said tubular members including a flange extending outwardly at or near the inner end of said tubular member.

In some embodiments, the static body assembly includes a sidewall defining at least partially the cavity housing the ball, said at least one spring assembly being located between said sidewall of the static body assembly and said flange of one of the tubular members.

In some embodiments, said at least one spring assembly includes a second spring assembly located between the movable member and said flange of one of the tubular members.

In some embodiments, the movable member includes one of the tubular members.

In some embodiments, the flange has an inner side facing the ball and an outer side opposite to the inner side, the biasing member abutting the outer side of the flange, the biasing member being variably loaded toward or away from the ball based on the variable force applied on the outer side of the flange via the cam and the movable member.

In some embodiments, the movable member includes: a first portion surrounding the first fluid passage and slidable thereon, the first portion extending orthogonally to said direction and pressing the biasing member; and a second portion extending from an end of the first portion, coaxially to said direction, and linked to the cam.

In some embodiments, the first portion is a plate provided with a hole mating the first fluid passage and the second portion is a wing extending from the plate.

In some embodiments, the cam includes a first cam element located at the top of the ball, proximate to a connection of the actuating mechanism with the ball.

In some embodiments, the cam further includes a second cam element located at the bottom of the ball and operatively connected thereto.

In some embodiments, the actuating mechanism includes a shaft rotatable about the axis of rotation, substantially orthogonal to said direction.

In some embodiments, the cam is integrally formed or connected to the shaft.

In some embodiments, the cam includes a major axis and a minor axis, and wherein: the valve is in the closed position when the minor axis of the cam is coaxial with said direction of the fluid; and the valve is in the open position when the major axis of the cam is coaxial with said direction of the fluid.

In some embodiments, said at least one load varying mechanism includes a first and second load varying mechanism, said first and second load varying mechanism including respective first and second biasing members for respectively pressing a first and a second one of the ball seat seals against the outer surface of the ball, and respective first and second movable members operatively connected to the cam and to the first and second biasing members, respectively.

In some embodiments, the ball has an ellipsoid-like shape with the through channel being provided along a minor axis, the ball acting as the cam.

In another aspect, a method for channeling a fluid through a ball valve is provided. The method includes:
a) providing the valve including:
   a static body assembly provided with fluid passages for circulating fluid therein in a direction at a fluid pressure, the static body assembly having a cavity, the fluid passages having respective ports opening in said cavity;
   a ball having a through channel and an outer surface, the ball being mounted within the cavity and being rotatable about an axis of rotation orthogonal to said direction of the fluid, between a closed position and an open position so as to obstruct or permit communication between the fluid passages via the through channel;
   ball seat seals interfacing with the outer surface of the ball, each one of the ball seat seals being provided between the ball and the static body assembly, and surrounding a respective one of the ports;
   an actuating mechanism operatively connected to the ball for moving the ball between the open and closed positions;
   a cam operatively connected to the actuating mechanism and rotatable therewith; and
   at least one load varying mechanism provided in the static body assembly, including:
      a biasing member pressing one of the ball seat seals against the outer surface of the ball with a variable sealing load force applied on the ball, toward the ball and coaxial with said direction; and
      a movable member operatively connected to the cam and to the biasing member;
b) applying a first sealing load force on the ball, coaxially to said direction when the valve is in the closed position;
c) actuating the valve, wherein the actuating includes:
   converting a rotation of the cam into a translation of the movable member such that the biasing member is variably loaded based on the different positions of the ball; and
   reducing the first sealing load force applied toward the ball while moving the valve between the closed and open positions.

In some embodiments, the first sealing load force is a maximum value of the variable sealing load force.

In some embodiments, the method further includes applying a second sealing load force on the ball, coaxially to said direction when the valve is in the open position.

In some embodiments, the second sealing load force is a minimum value of the variable sealing load force.

In some embodiments, the first sealing load force is about 3 to 10 times greater than a predetermined sealing load force sufficient to substantially seal the valve.

In some embodiments, the first sealing load force is applied from both ball seat seals, toward the ball.

In some embodiments, the second sealing load force is applied from both ball seat seals, toward the ball.

In some embodiments, the actuating of the valve further includes creating a gap between the ball seat seals and the ball while moving the ball between the closed and the open positions.

In yet another aspect, a method for operating a ball valve is provided. The method includes:
a) providing the valve including:
   a static body assembly provided with fluid passages for circulating fluid therein in a direction at a fluid pressure, the static body assembly having a cavity, the fluid passages having respective ports opening in said cavity;
   a ball having a through channel and an outer surface, the ball being mounted within the cavity and being rotatable about an axis of rotation orthogonal to said direction of the fluid, between a closed position and an open position so as to obstruct or permit communication between the fluid passages via the through channel;
   ball seat seals interfacing with the outer surface of the ball, each one of the ball seat seals being provided between the ball and the static body assembly, and surrounding a respective one of the ports;
   an actuating mechanism operatively connected to the ball for moving the ball between the open and closed positions;
   a cam operatively connected to the actuating mechanism and rotatable therewith; and
   at least one load varying mechanism provided in the static body assembly, including:
      a biasing member pressing one of the ball seat seals against the outer surface of the ball with a variable sealing load force applied on the ball, toward the ball and coaxial with said direction; and
      a movable member operatively connected to the cam and to the biasing member;
b) determining a sealing load force sufficient to substantially seal the valve;
c) applying a first sealing load force being about 3 to 10 times greater than the sealing load force sufficient to substantially seal the valve, when the valve is in the closed position; and
d) actuating the valve, wherein the actuating includes applying a second sealing load force to the ball when the valve is between the open and closed positions, the second sealing load force being lower than the sealing load force sufficient to substantially seal the valve.

In some embodiments, the first and second sealing load forces are applied on both ball seat seals, toward the ball.

In some embodiments, the actuating of the valve further includes creating a gap between the ball seat seals and the ball while moving the ball between the closed and the open positions.

BRIEF DESCRIPTION OF THE DRAWINGS

FIG. 5A is a partial perspective view of the ball valve of FIG. 1, shown in a closed position;

FIG. 5B is a partial perspective view of the ball valve of FIG. 1, shown in an open position;

FIG. 10 is a cross-section view of the ball valve of FIG. 9, shown in a closed position;

FIG. 10A is a partial close-up view of the ball valve of FIG. 10;

FIG. 12 is a cross-section view of the ball valve of FIG. 9, shown in an open position; and FIG. 12A is a partial close-up view of the ball valve of FIG. 12.

DETAILED DESCRIPTION

Figure 1:
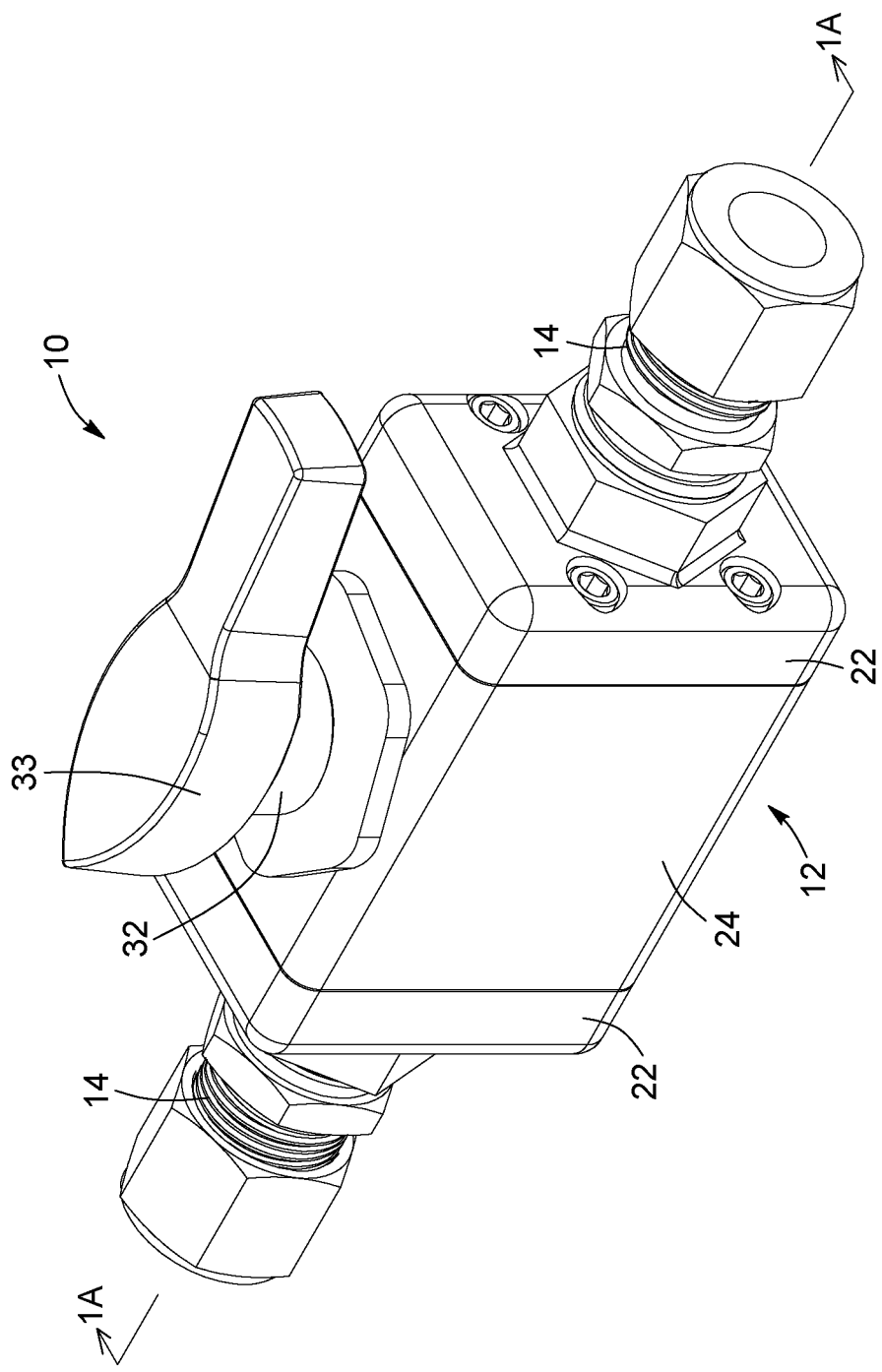
FIG. 1 is a perspective view of a ball valve, according to an embodiment.

Within the following description, similar features of the drawings have been given similar reference numerals. To preserve the clarity of the drawings, some reference numerals have been omitted when they were already identified in a preceding figure.

The implementations described below are given by way of example only and the various characteristics and particularities thereof should not be considered as being limitative of the scope of the present invention. Unless otherwise indicated, positional descriptions such as "top", "bottom" and the like should be taken in the context of the figures and should not be considered as being limitative.

Referring to FIGS. 1, 1A, 1B, 5A and 5B, a ball valve 10 is provided and includes a static body assembly 12 provided with connectors 14 and fluid passages 16 for circulating fluid therein in a direction at a fluid pressure. In this particular embodiment, the direction of the fluid extends longitudinally between the connectors 14, which are facing one another. The static body assembly 12 has a cavity 18, and the fluid passages 16 have respective ports 20 opening in the cavity 18. In the embodiment shown, the static body assembly 12 includes lateral parts 22 and a central part 24. In some embodiments, each one of the lateral parts 22 receives one of the connectors 14, which connects a source of fluid with a respective one of the fluid passages 16.

Figure 1A:
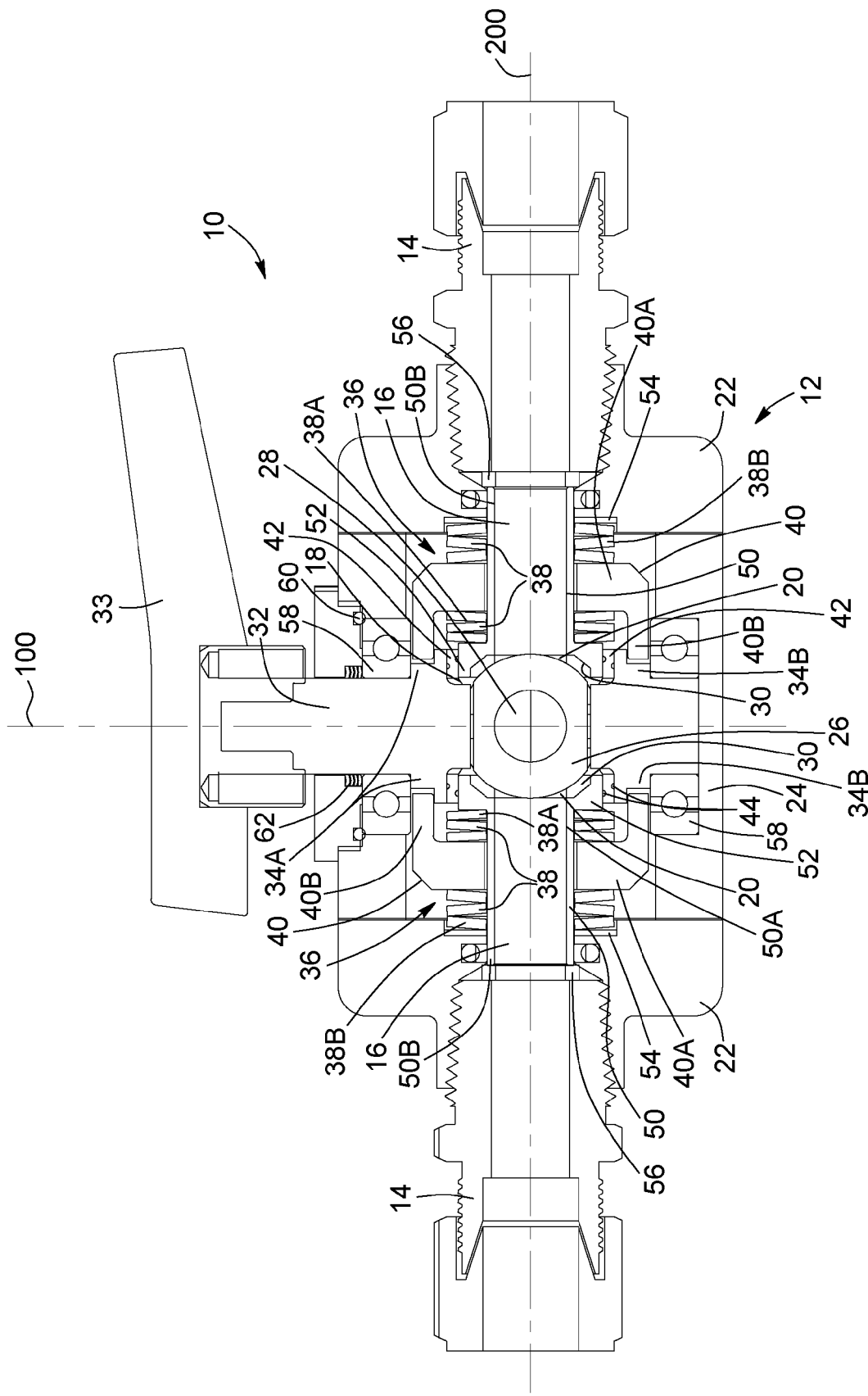
FIG. 1A is a cross-section view of the ball valve of FIG. 1 taken along line 1A-1A in FIG. 1.
Figure 1B:
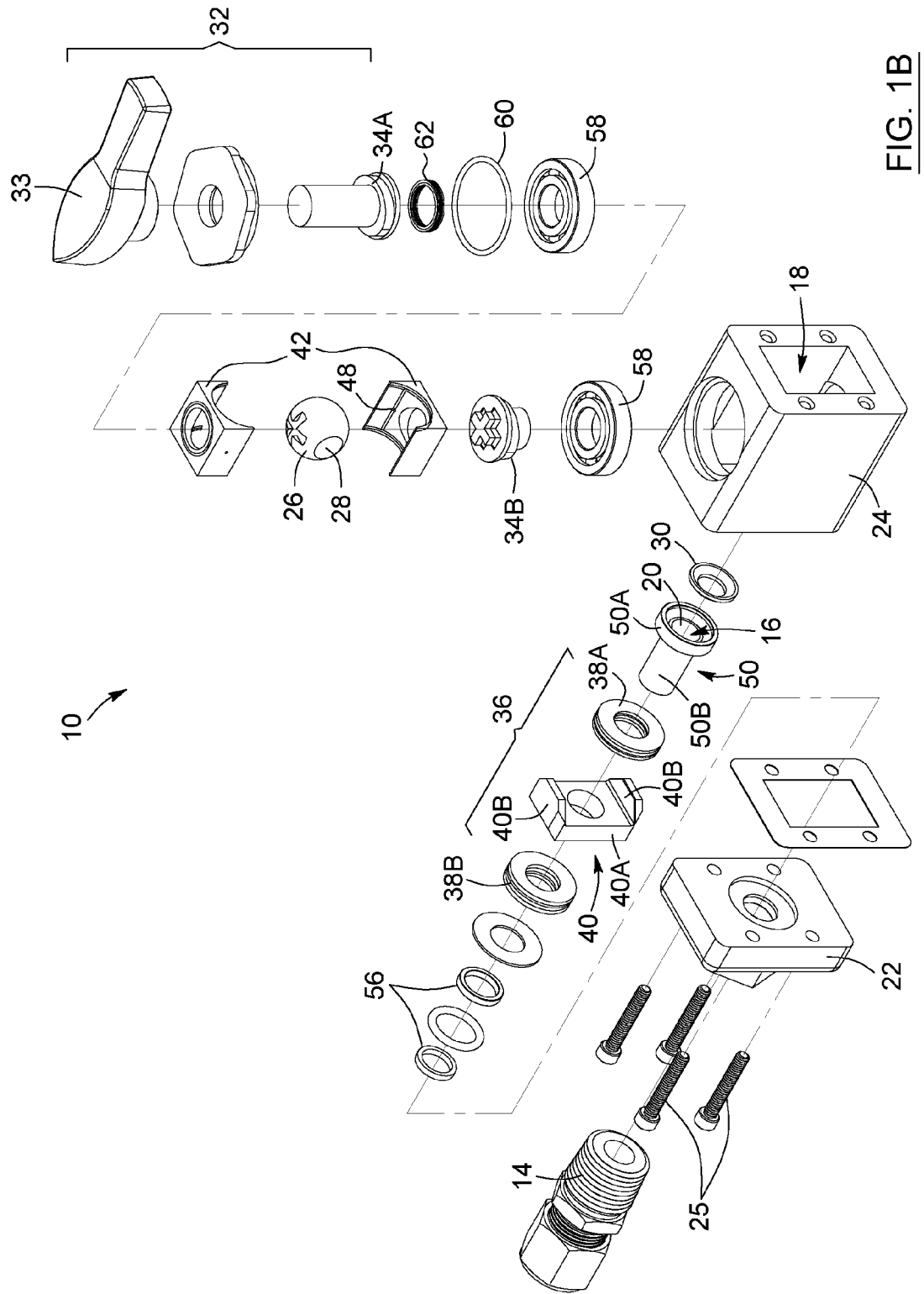
FIG. 1B is a partial exploded view of the valve of FIG. 1.

In the embodiment shown on FIGS. 1, 1A and 1B, the ball valve 10 includes two connectors 14 and two fluid passages 16. The fluid passages 16 have the same diameter and a common longitudinal axis 200. Each one of the fluid passages extends from the cavity 18, located substantially at the center of the central part 24, to a respective one of the lateral parts 22 where each one of the fluid passages 16 is connected with a respective one of the connectors 14. The lateral parts 22 are affixed to the central part 24 by means of bolts 25. It is understood that other affixing means or fasteners can be used, such as anchor bolts, magnets, flanges, rivets, nails or clamps. Alternatively, it is understood that the static body assembly 12 can be a one-piece structure, with the lateral parts 22 being directly moulded onto the central part 24. Forming the static assembly with distinct central and lateral parts facilitates the assembly or disassembly of the valve. The static body assembly 12 can be made of metallic materials such as brass, bronze, cast iron, copper, stainless steel and/or plastic materials such as PVC and/or CPVC.

The valve 10 also includes a ball 26 which is the movable element of the valve 10 (i.e., the valve element of the valve 10). The ball 26 has a through channel 28 and an outer surface. The ball 26 is mounted within the cavity 18 and is rotatable about an axis of rotation 100 orthogonal to the direction of the fluid, between a closed position and an open position so as to obstruct or permit communication between the fluid passages 16 via the through channel 28. In the embodiments shown on the Figures, the direction of the fluid is parallel to axis 200, but it is understood that in other embodiments, the direction of the fluid may not necessarily be parallel to one particular axis. Typically, the axis of rotation of the ball is orthogonal to the direction of the fluid when the valve is in the open position.

In some embodiments, the valve 10 further includes ball seat seals 30 acting as the interface between the movable ball and the static housing. The ball seat seals interact, and are typically in contact with the outer surface of the ball 26. The ball seat seals 30 are best shown in FIGS. 5A and 5B. In some embodiments, each one of the ball seat seals 30 is provided between the ball 26 and the static body assembly 12, and surrounds a respective one of the ports 20. The ball seat seals 30 can be made of a flexible (i.e., compressible) material such as a thermoplastic material and/or an elastomeric material. For example, the ball seat seals 30 can be made of Teflon (TFE), filled TFE, Nylon™, Neoprene, nitrile rubber or a combination thereof. It is understood that the ball seat seal materials and the static body assembly materials are chosen so that they are compatible with the materials being handled by the valve 10, and in function of the operating temperature of the valve.

The valve 10 further includes an actuating mechanism 32 operatively connected to the ball 26 for moving the ball 26 between the open and the closed positions. In some embodiments, the actuating mechanism 32 is a shaft rotatable about the axis of rotation 100, substantially orthogonal to the direction of fluid circulation. The actuating mechanism 32 can for example be a "quick-acting type" actuating mechanism, which requires a 90° turn of the valve handle 33 to operate the valve 10. In some embodiments, the actuating mechanism 32 includes a planetary gear in order to allow for a small operating force to operate the valve 10. In alternate embodiments, the actuating mechanism 32 can be a motor or another type of actuating mechanism known in the art.

Still referring to FIGS. 1, 1A, 1B, 5A and 5B, the valve 10 further includes a cam 34A operatively connected to the actuating mechanism 32, and rotatable therewith. At least one load varying mechanism 36 is provided in the valve. The load varying mechanism includes a biasing member 38 and a movable member 40. The load varying mechanism is typically provided in the static body assembly 12. The biasing member 38 presses one of the ball seat seals 30 against the outer surface of the ball 26 with a variable sealing load force applied on the ball 26, toward the ball 26 and parallel with the direction of the fluid. The movable member 40 is operatively connected to the cam 34A and to the biasing member 38 such that a rotation of the cam 34A induces translation of the movable member 40 parallel to the direction of the fluid, thereby variably loading the biasing member 38 toward or away from the ball 26, based on the different positions of the ball 26. For example, the biasing member 38 can include at least one spring assembly, such as a compression spring assembly and/or an extension spring assembly and/or at least one Belleville stack. In this particular embodiment, two load varying mechanisms are provided on each side of the valve, one acting on the ball seat seal 30 surrounding the port 20 of the left side of FIG. 1A, and one acting on the ball seat seal 30 surrounding the port 20 on the right side of FIG. 1A. Of course, in other embodiments, a single load varying mechanism 36 could be provided, on a single side of the valve 10. It will be noted that a sealing load force is preferably always applied by the biasing member 38 on the ball seat seals 30, toward the ball 26, in the closed and in the open position. However, the sealing load force is reduced while the ball 26 is being rotated, to reduce friction and wear of the ball against a static interface. The sealing load force applied varies as a function of the position of the rotatable shaft 32 and thus of the ball 26, since they are mechanically coupled. The load varying mechanism typically includes a spring assembly, which can include one or more sub-assemblies, which press(es) the ball seat seals 30 against the outer surface of the ball 26. When rotating the shaft 32, the cam 34A compresses or decompresses the spring assembly such that the sealing load force is high in the closed, and is lowered in between the open and closed positions as well as in the open position. In the embodiment shown on FIGS. 1, 1A, 1B, 5A and 5B, the sealing load force is applied on the ball 26 independently of the fluid pressure in the valve 10. Wear of the ball seat seals 30 can be advantageously reduced by limiting the sealing load force applied thereto during movement of the ball 26 (i.e., during actuation of the valve 10). The force which is necessary to apply on the actuating mechanism in order to rotate the cam may also be reduced when using some embodiments of the load varying mechanism described herein.

In some embodiments, such as the one shown in FIGS. 1, 1A and 1B, the cam includes a first cam element 34A located at the top of the ball 26, proximate to the connection of the actuating mechanism 32 with the ball 26. The cam may 34 further include a second cam element 34B located at the bottom of the ball 26 and operatively connected thereto. The cam 34A and/or 34B can be integrally formed in the actuating mechanism 32, or otherwise connected thereto. In this embodiment, cam element 34A is integrally formed at the base of the rotatable shaft, but it is possible to form the cam 34A as a ellipsoid ring inserted over the shaft and affixed to the base of the shaft. Each one of the cam elements 34A, 34B can have a major axis and a minor axis. The valve 10 is in the closed position when the minor axis of the cam elements 34A and/or 34B is/are parallel with the direction of the fluid, and the valve 10 is in the open position when the major axis of the cam elements 34A and/or 34B is/are parallel with the direction of the fluid. Upon rotation of the ball 26, the first and second cam elements 34A, 34B rotate and induce translational movement of the movable member 40, thereby variably loading the biasing member 38. The translation of the movable element is parallel to the direction of the fluid and to the sealing load force applied by the biasing element 38. The variable load reduces the sealing load force applied on the ball seat seal toward the ball, and in a direction substantially parallel to the direction of fluid in the valve. In the embodiments shown in the Figures, the ball valve 10 is a two-way valve, but it is understood that other types of ball valves may be considered, such as a three way valve, a L-type valve, a T-type valve, or more generally, a multi-way valve.

Figure 6B:
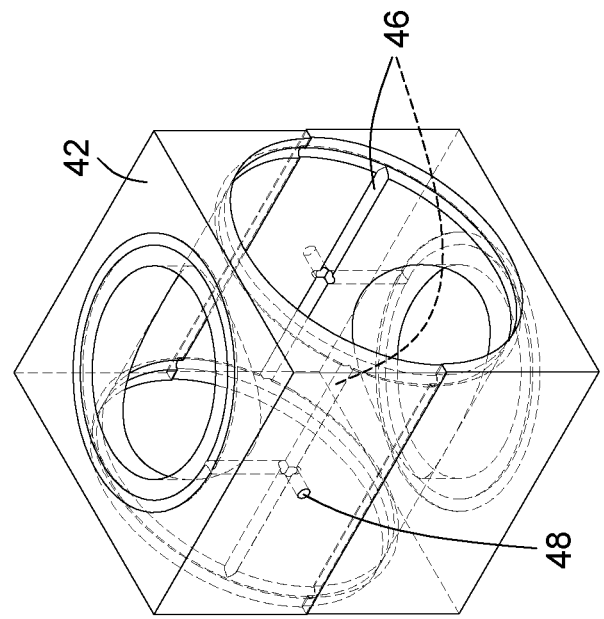
FIG. 6B is a perspective view of the purging system of the ball valve shown in FIG. 6A.
Figure 6A:
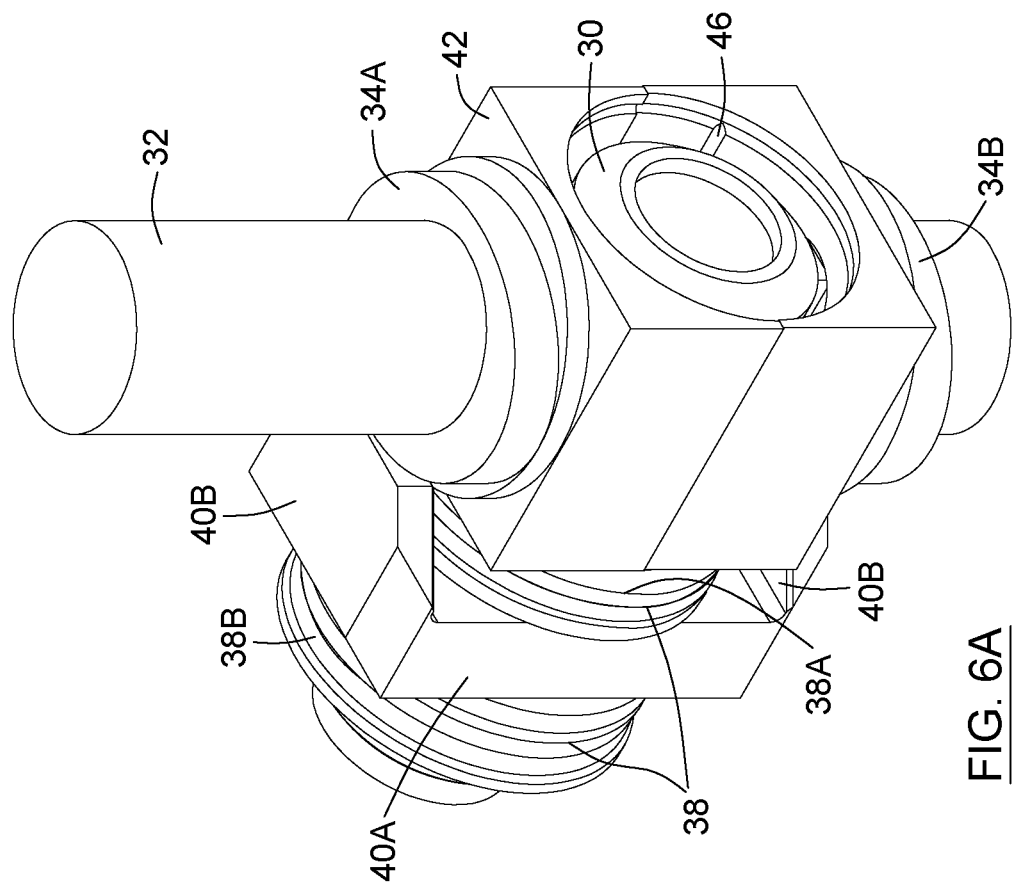
FIG. 6A is a partial perspective view of the ball valve of FIG. 1 including an optional purging system.

Now referring to FIGS. 1, 1A, 1B, 6A and 6B, the ball 26 is encased in a packing 42 (identified in FIG. 1B, 6A and 6B). The packing 42 is located substantially at the center of the static body assembly 12. The biasing member 38 ensures that at least a minimal sealing load force is applied on the ball 26 at all times, and the load varying mechanism 36 ensures that the variable sealing load force is reduced during movement of the ball 26 or when the valve 10 is in the open position. Surrounding seals 44 (identified in FIG. 1) may optionally be provided around the packing 42 to contain fluid when the sealing load force is minimal on the ball 26, during movement of the ball 26 or when the valve 10 is in the open position. The surrounding seals 44 prevent potential contamination from the actuating mechanism 32. Additionally, the packing 42 may optionally be provided with purging channels 46 and purging grooves 48. The purging channels 46 and grooves 48 allow for the injection and circulation of purging fluid in the packing 42 and around the ball 26 for purging any unwanted fluid or impurities that may be trapped therein. In this case, the packing 42 is made of two parts, each having a top aperture for receiving the cam elements 34A, 34B, and side openings for accommodating the through channel of the ball.

In some embodiments, the fluid passages 16 are defined at least partially by tubular members 50, also referred to as ducts or tubes. In the embodiment shown in FIGS. 1, 1A, 1B, the tubular members 50 have respective opposite inner ends 50A and outer ends 50B, the inner ends 50A facing the ball 26. In some embodiments, at least one of the tubular members 50 includes a flange 52 extending outwardly at or near the inner end 50 of the tubular members 50. In the embodiment shown, each one of the tubular members 50 includes a first hollow cylinder, and each one of the flanges 52 includes a second hollow cylinder having a larger diameter than the diameter of the first hollow cylinder, with the ports 20 being defined at the junction of the first hollow cylinder with the second hollow cylinder. In the embodiment shown, each one of the ball seat seals 30 is an annular ring having an inner diameter equal to or larger than the diameter of the first hollow cylinder, and an outer diameter smaller than the diameter of the second hollow cylinder.

In some embodiments, the biasing member 38 includes at least one spring assembly provided around one of the fluid passages 16. In some embodiments, the static body assembly 12 includes a sidewall 54 defining at least partially the cavity 18 housing the ball 26. The at least one spring assembly can include a first spring assembly 38A located between the sidewall 54 of the static body assembly 12 and the flange 52 of one of the tubular members 50. It is understood that by "located between", it is meant that the at least one spring assembly can be in direct or indirect contact with the sidewall 54 and the flange 52. In other words, the first spring assembly 38A can be contacting other pieces or elements which are in direct contact with the sidewall 54 and the flange 52.

In the embodiment shown in FIGS. 1, 1A, 1B, 5A and 5B, the at least one spring assembly includes the first spring assembly 38A and a second spring assembly 38B. The second spring assembly 38B is located between the movable member 34 and the flange 52 of one of the tubular members 50. In the embodiment shown, the spring assemblies 38A, 38B are compression spring assemblies compressible to different sizes for applying the different sealing load forces. The flange 52 has an inner side facing the ball 26 and an outer side opposite to the inner side. The first spring assembly 38A abuts the outer side of the flange 52, and is variably loaded toward or away from the ball 26 based on the variable force applied on the outer side of the flange via the cam 34 and the movable member 40.

In some embodiments, the movable member 40 includes a first portion 40A and a second portion 40B. The first portion 40A of the movable member 40 surrounds the fluid passage 16 and is slidable thereon, the first portion 40A extending orthogonally to the direction of fluid circulation and pressing the biasing member 38. The second portion 40B extends from an end of the first portion 40A, coaxially to the direction of fluid circulation, and is linked to the cam 34. In the embodiment shown on FIGS. 1, 1A and 1B, the first portion 40A is a plate provided with a hole mating the fluid passage 16, and the second portion 40B includes two wings extending from the plate, orthogonally from the plate and toward the ball 26. It is understood that the movable member 40 can be a one-piece structure, as shown in the embodiment of FIGS. 1, 1A and 1B, but can also be formed of two or more separate pieces.

In some embodiments, and as shown in FIGS. 1, 1A and 1B, the at least one load varying mechanism 36 includes a first and a second load varying mechanism. The first and second load varying mechanisms 36 include respective first and second biasing members 38 for respectively pressing a first and second one of the ball seat seals 30 against the outer surface of the ball 26. The first and second load varying mechanisms 36 also include respective first and second movable members 40 operatively connected to the cam 34 and to the first and second biasing members 38, respectively. In other embodiments not shown in the Figures, the valve can include one load varying mechanism 36 to variably load the biasing element 38 toward the ball 26 from one side only. In such a case, the valve 10 is not a symmetrical valve.

In some implementations not shown in the Figures, the load varying mechanism 36 may include a first motor for varying the position of the movable member 40, and a controller receiving the different positions of the ball 26 for controlling the motor based on the different positions of the ball 26. The valve 10 may also include a position sensor connected to the controller to detect the different positions of the ball 26 and to send the detected positions to the controller. Optionally, the actuating mechanism 32 may include a second motor for moving the ball 26 between the different positions. The second motor may also be connected to the controller.

Optionally, soft seats 56 (identified in FIG. 1B) may be provided at the base of at least one of the fluid passages 16 in order to prevent the fluid from contacting the base of each of the fluid passages 16. The soft seats 56 help reducing pressure buildup on the ball 26 and may also absorb some of the permissible play of the ball seat seals 30. Optional energized seals (not shown) may also be provided in order for the valve to handle extreme service conditions such as high temperatures or high pressure levels.

Now referring to FIGS. 1A and 1B, the valve 10 optionally includes support elements 58 for supporting the different parts provided along axis 100. In the embodiment shown, the supports elements 58 include a first ball bearing 58A located adjacent the first cam element 34A and a second ball bearing 58B located adjacent the second cam element 34B. The ball bearings 58A, 58B help to maintain the position of the ball assembly, including the ball 26 and the packing 42, under high pressure. It is understood that the support elements 58 can be other types of support elements such as plain bearings, rolling element bearings of any type, bushings, and magnetic bearings. The valve 10 may also be provided with an optional axial seal 60 to further enhance sealing and prevent fluid from leaking out of the valve 10. In the embodiment shown, the valve is also provided with an optional stem packing 62 located around the shaft 28 and adjacent to the first support element 58A, so as to eliminate outboard leaks.

Figure 7:
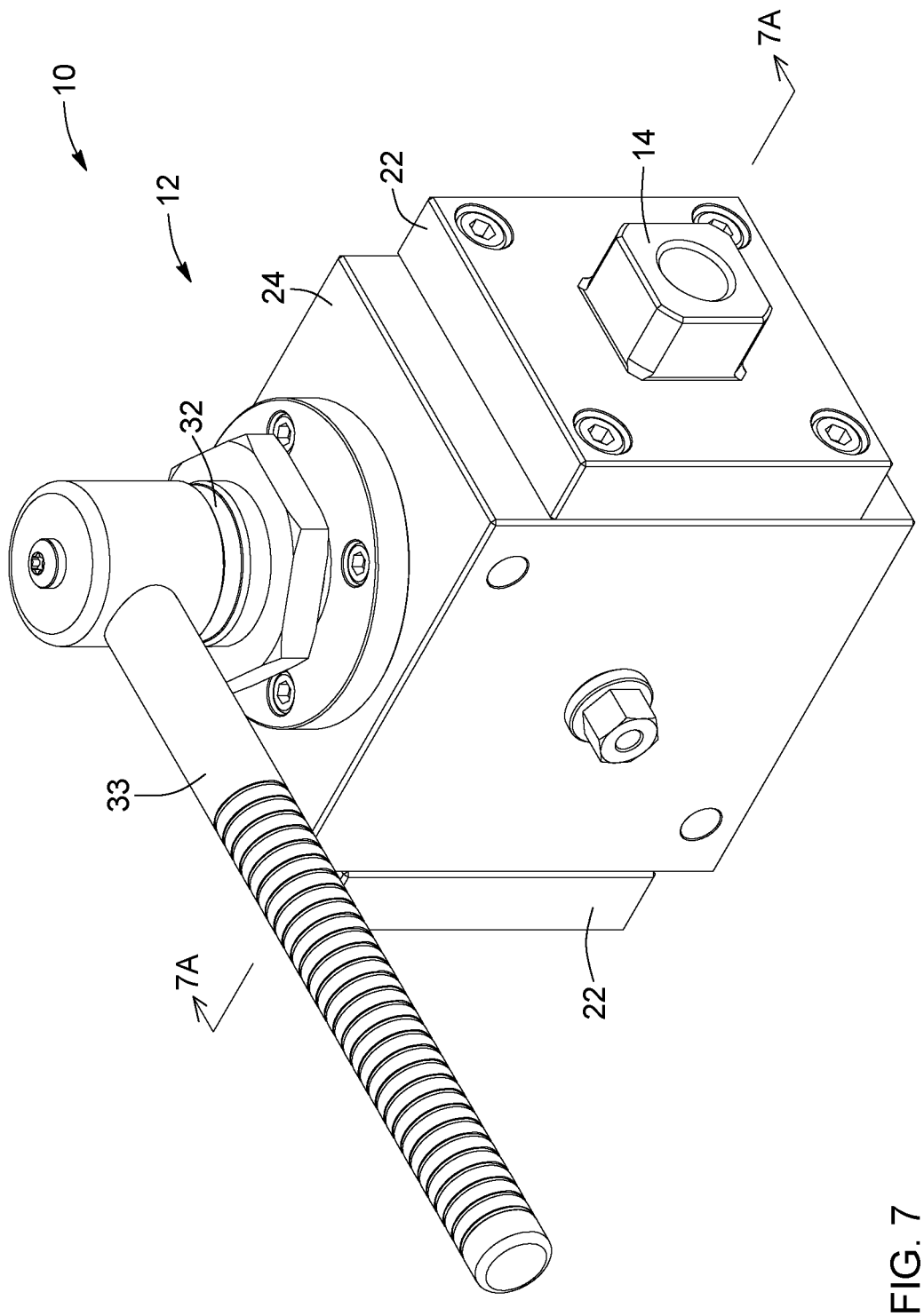
FIG. 7 is a perspective view of a ball valve, according to another embodiment.
Figure 7A:
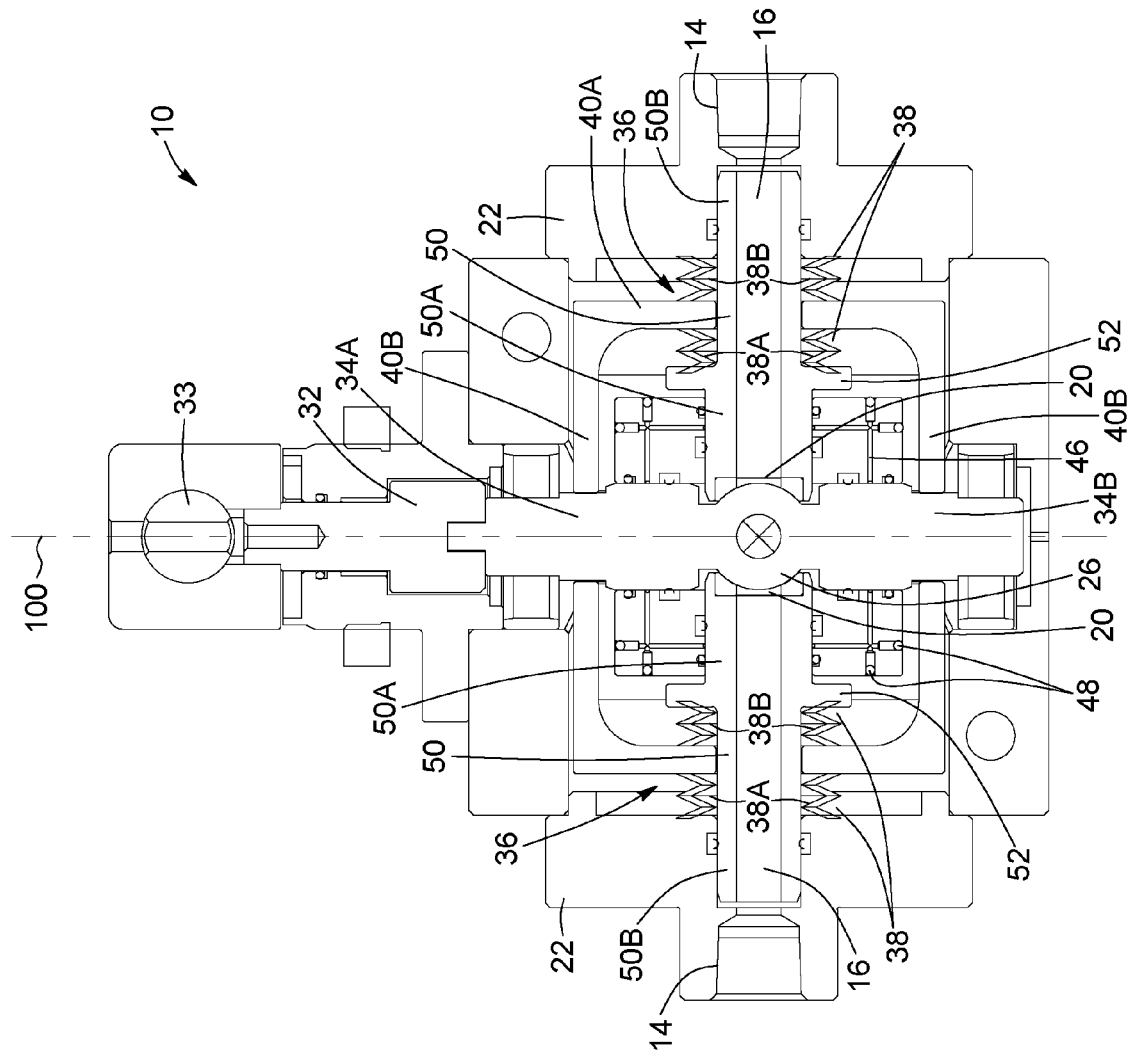
FIG. 7A is a cross-section view of the ball valve of FIG. 7 taken along line 7A-7A in FIG. 7.
Figure 7B:
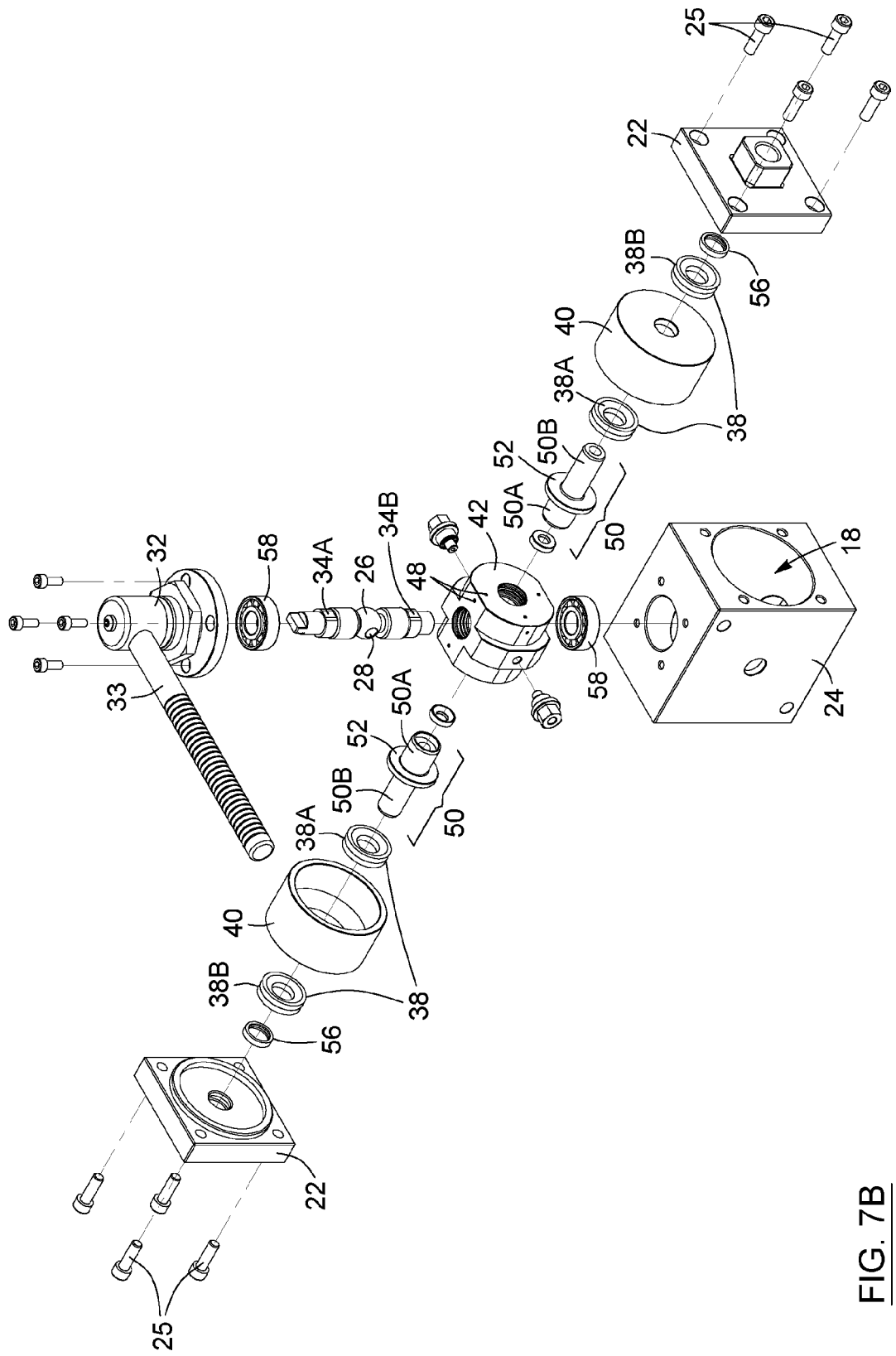
FIG. 7B is an exploded view of the valve of FIG. 7.

Now turning to FIGS. 7, 7A and 7B, in some embodiments, the ball 26 and the first and second cam elements 34A, 34B form one integral piece. This configuration may result in reduced wear of the different pieces as less mechanical connections are required, and also eases the manufacturing and assembling process due to the reduced number of parts.

Figure 9:
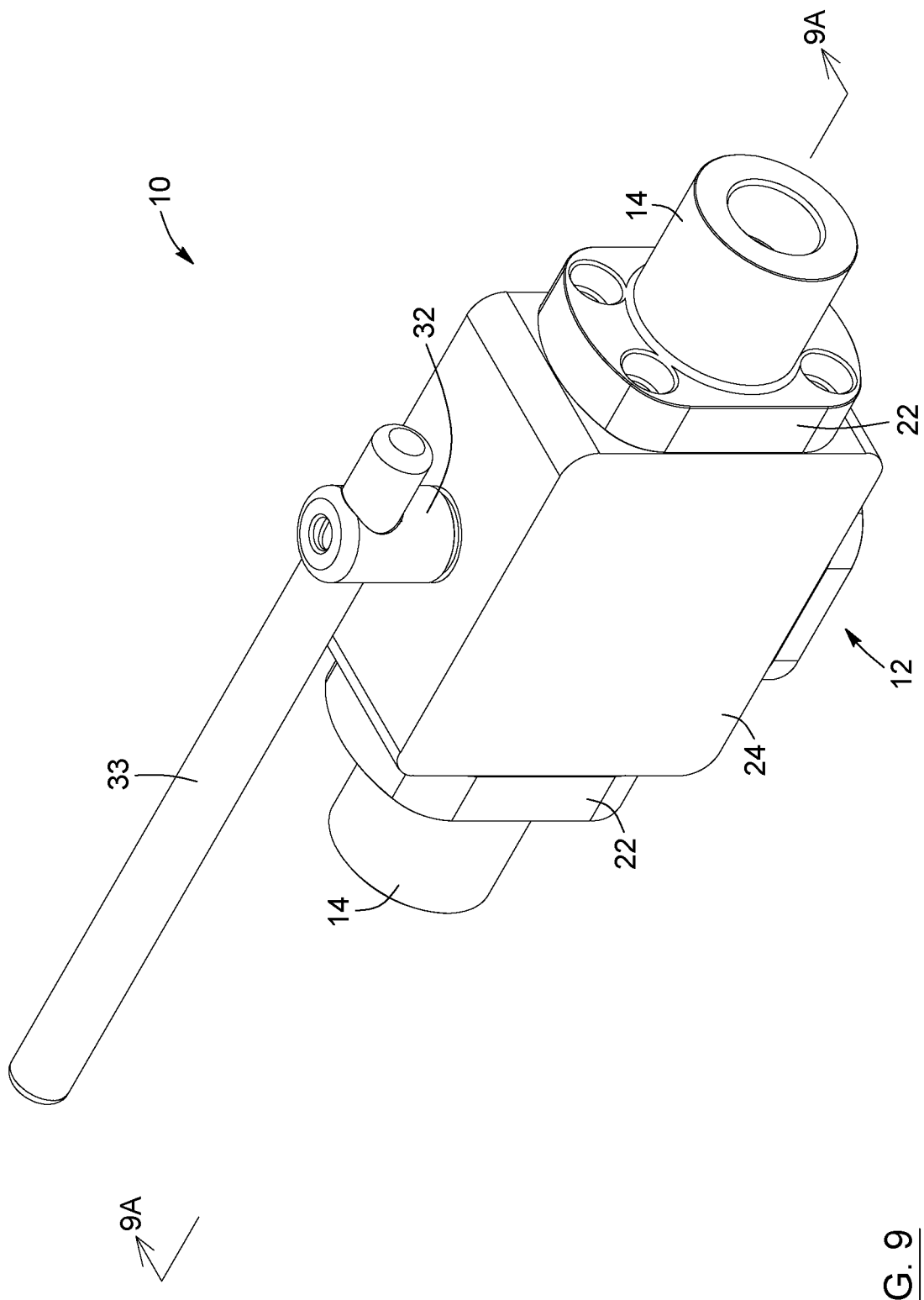
FIG. 9 is a perspective view of a ball valve, according to yet another embodiment.
Figure 9A:
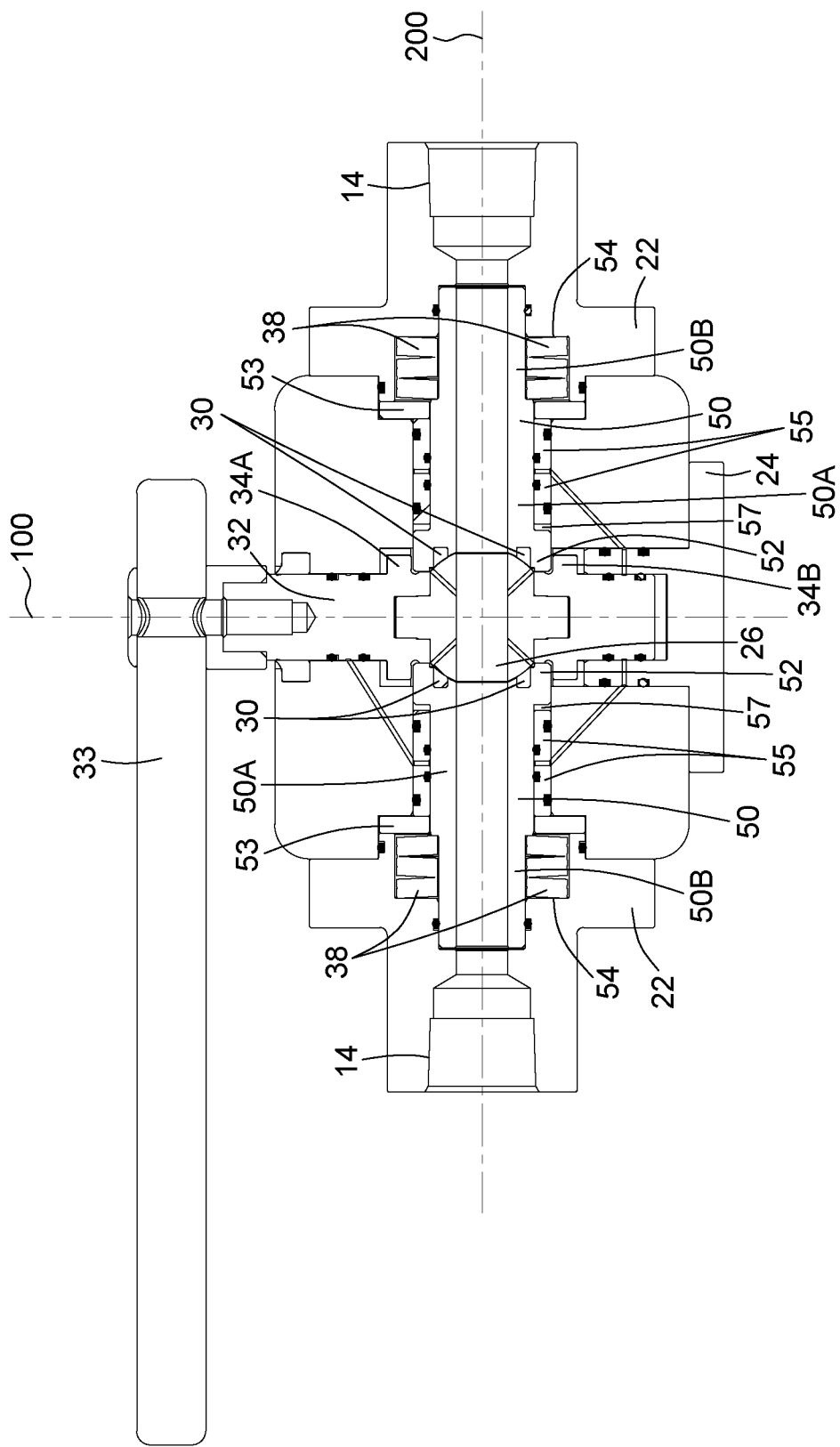
FIG. 9A is a cross-section view of the ball valve of FIG. 9, taken along line 9A-9A in FIG. 9.
Figure 9B:
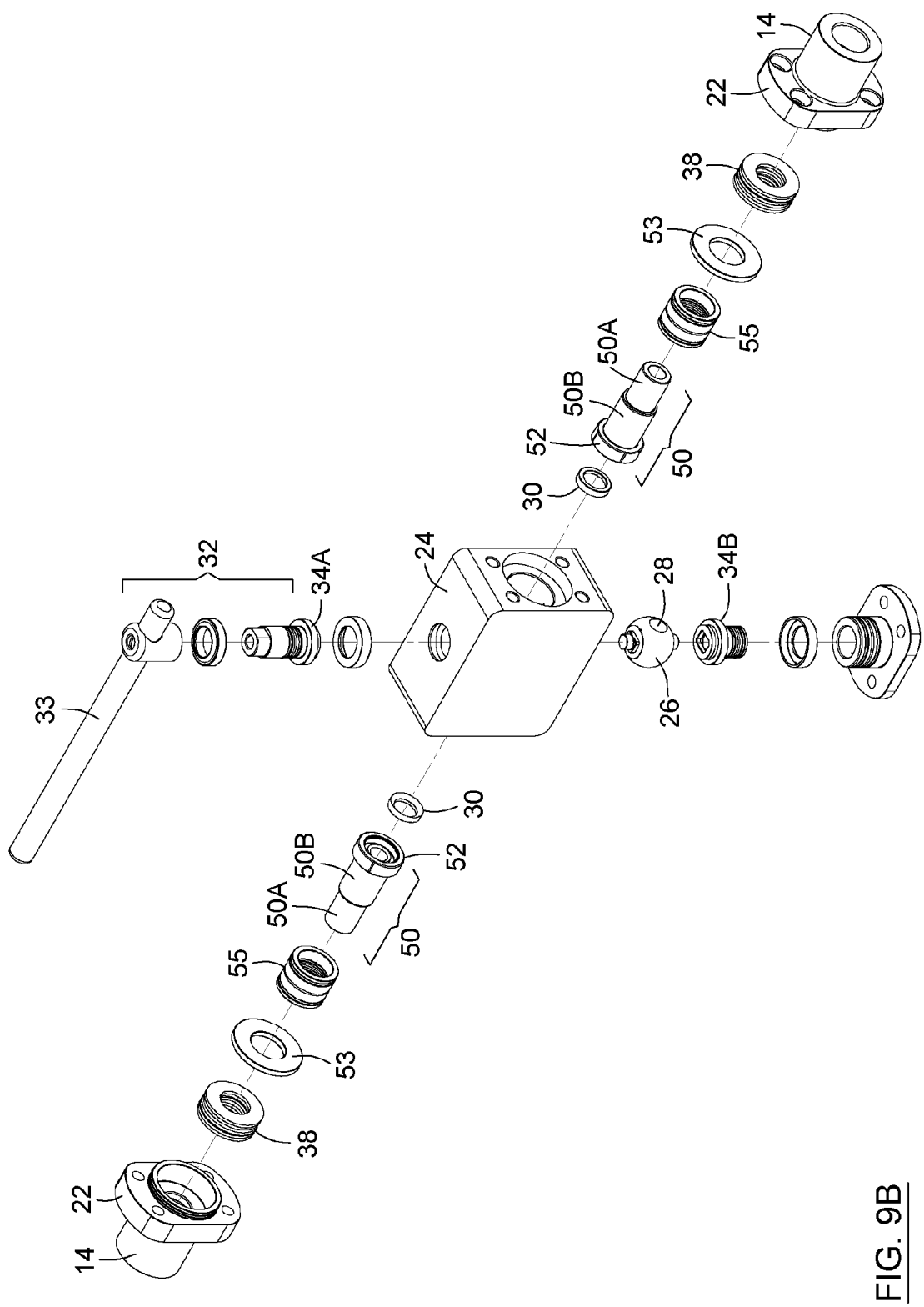
FIG. 9B is an exploded view of the valve of FIG. 9.
Figure 11:
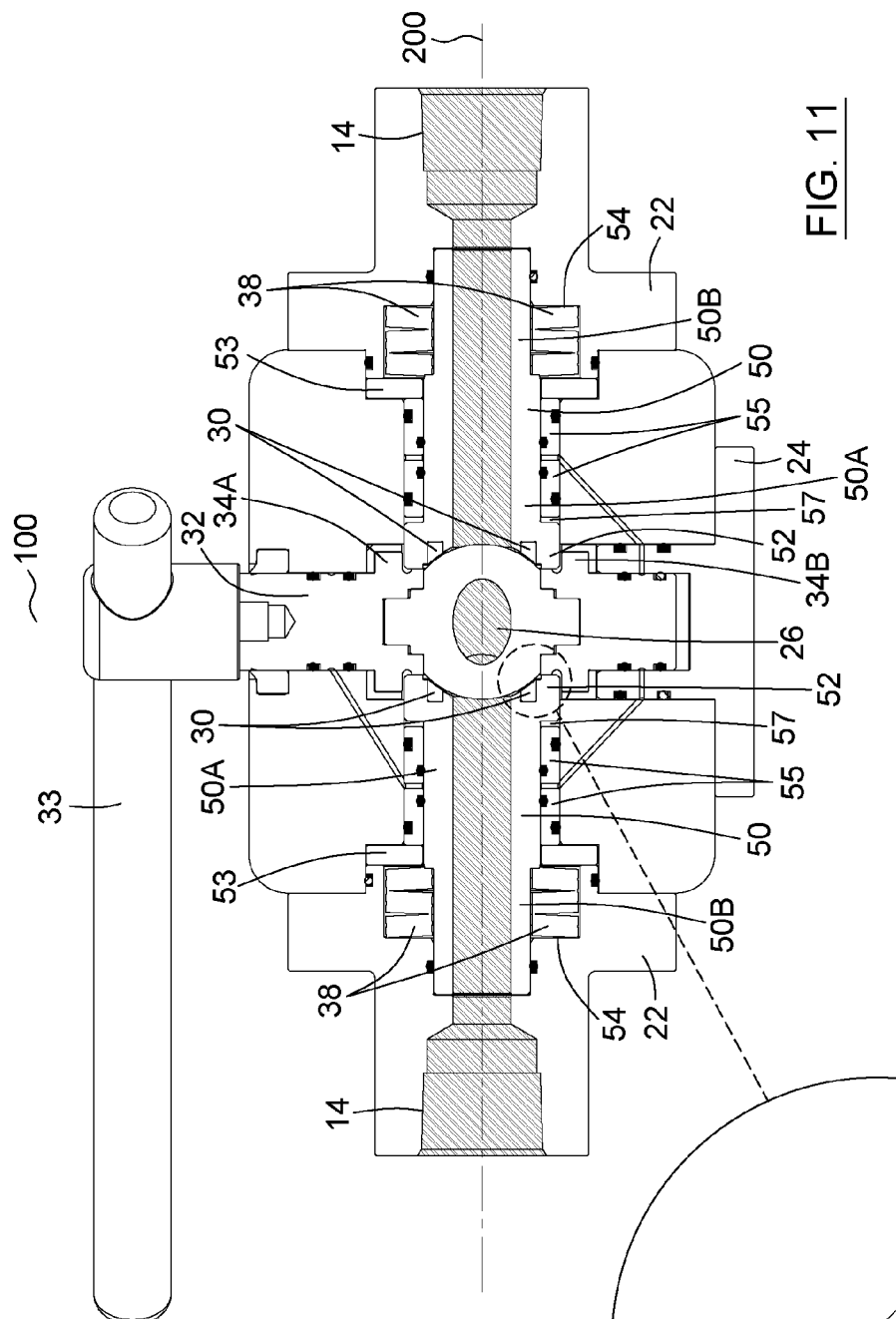
FIG. 11 is a cross-section view of the ball valve of FIG. 9, shown during movement of the ball, the valve being between the closed and the open position.
Figure 11A:
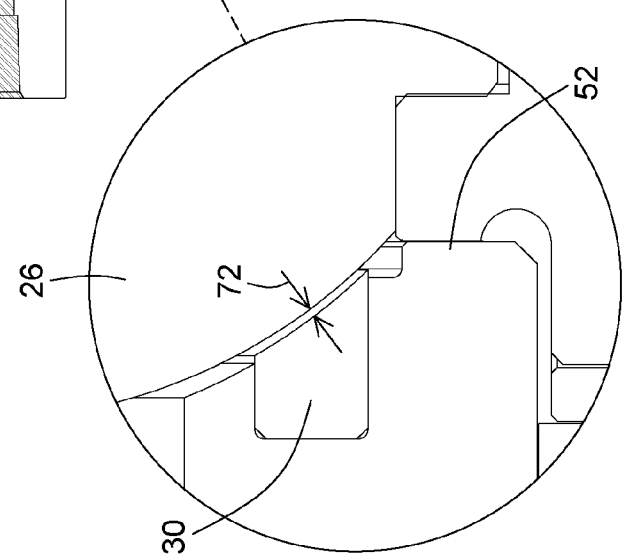
FIG. 11A is a partial close-up view of the ball valve of FIG. 11.

Now referring to FIGS. 9, 9A and 9B, the movable member 40 can include at least one of the tubular members 50. Optionally, hydraulic pressure can be strategically used to increase the load on the ball 26 so as to provide better sealing and/or to help easing the rotation of the ball 26 by pushing the fluid passages 16 away from the ball seat seals 30 upon rotation, thereby lowering said load. In other words, the sealing load force can depend on the fluid pressure in the fluid passages 16. In the embodiment shown, the two tubular members 50 are movable members. The rotation of the actuating mechanism 32 and the cam elements 34A, 34B push both tubular members 50 away from the ball 26, as a portion of the flange 52 of each one of the tubular members 50 is operatively connected to the cam elements 34A, 34B. As each one of the tubular members 50 is being pushed away from the ball 26, the respective biasing element 38 (which is, in this case, a compression spring assembly) is compressed between a plate 53 surrounding the tubular member 50 and a sidewall 54 of the lateral part 22 of the static body assembly 12.

Still referring to FIGS. 9, 9A and 9B, a sealing assembly 55 can be provided around the tubular passage 50, between the plate 53 and the flange 52. In some embodiments, the sealing assembly 55 includes a plurality of gaskets or sealing rings or, alternatively the sealing assembly 55 can be a one-piece sealing ring. In some embodiments, the sealing assembly 55 is positioned such that a chamber 57 is defined between the flange 52 and the sealing assembly 55. The fluid passing through the valve 10 can fill the chamber 57 and apply a sealing force on the ball 26 when the valve 10 is in the closed position.

In some scenarios, the translation of the movable members 50, induced by the rotation of the cam, creates a gap between the ball seat seals 30 and the ball 26, which reduces the sealing load pressure on the ball 26. In some embodiments, the cam elements 34A, 34B have a cam profile such that a rotation of the actuating mechanism 32 of a few degrees (e.g. 2 degrees, 5 degrees or 10 degrees, or more generally between 2 degrees and 10 degrees) induces translation of the movable members 50 away from the ball 26 and the creation of the gap between the ball seat seals 30 and the ball 26. In some embodiments, when the ball seat seals 30 is not contacting the ball 26 (i.e., when the gap is present), the chamber 57 is in fluid communication with the fluid passages 16 and the fluid pressure in the chamber 57 is substantially equal to the fluid pressure in the fluid passages 16.

Figure 8A:
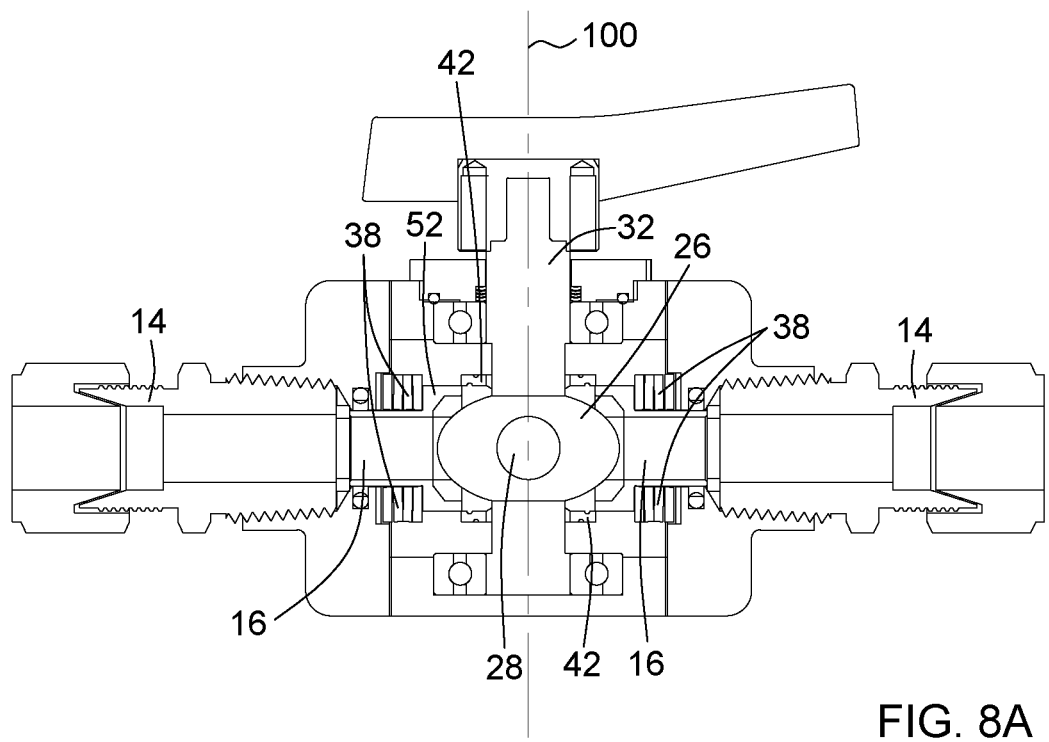
FIG. 8A is a cross-section view of another embodiment of a ball valve, shown in a closed position and in which the ball has an ellipsoid-like shape.
Figure 8B:
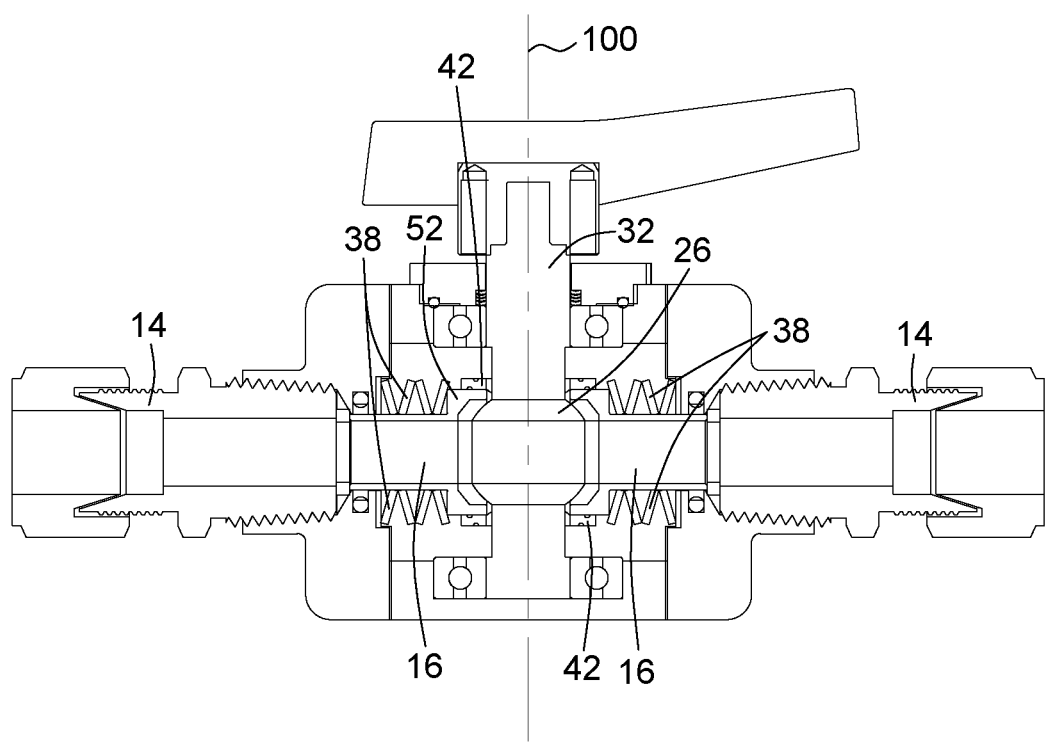
FIG. 8B is the same cross-section view as shown in FIG. 8A, with the valve in an open position.

Now referring to FIGS. 8A and 8B, in some embodiments, the ball 26 of the valve 10 has an ellipsoid-like shape. In the embodiment shown, the ball 26 acts as the cam 34 and has an elongated spheroid-like shape, with the through channel 28 being provided along the minor axis. In the embodiment shown, a biasing member 38 is provided around each of the fluid passages 16. Each one of the biasing members 38 is a compression spring assembly 38 and the ball 26 acts as the cam 34 to compress or stretch the spring assembly 38. When the elongated portion of the ball (corresponding to the major axis of the ellipsoid) is parallel to the axis 200, the valve 10 compresses the spring assemblies 38 and is in the closed position. When the flattened portion of the ball (corresponding to the minor axis of the ellipsoid) faces the spring assemblies 38, the spring are stretched and the valve is in the open position. In the embodiment shown, the valve 10 does not include a cam separate from the ball 26, and the movable member 40 includes the tubular members 50. Each one of the spring assemblies 38 applies a sealing load force on the respective ball seat seal 30 when they are compressed and the valve is in the closed position. When the valve 10 is in an open position, the spring assemblies 38 are stretched and apply a reduced sealing load force on the respective ball seat seal 30. When the valve 10 is in an intermediate position and the ball 26 is moving between the closed and open positions (i.e., a throttled position), the sealing load force is progressively reduced.

Still referring to FIGS. 8A and 8B, in some embodiments, the ball seat seals 30 are made of a flexible/compressible material such as a thermoplastic material, to conform to the shape of the ball 26 while still maintaining an effective sealing when the valve 10 is in the closed or the open position, or during movement of the ball 26. Similarly, side walls of the fluid passages 16 can also include or be made of a flexible/compressible material such as a thermoplastic material, to compensate for the difference between the length of the major and minor axes of the ball 26.

It is understood that the ball valve 10 can be used in various fields of applications, such as the chemical, oil, and pharmaceutical industries, among others. The ball valve 10 can be used for flow control, pressure control, level control, emergency shutdown etc. For example, the ball valve 10 can be used in chromatography.

Figure 2:
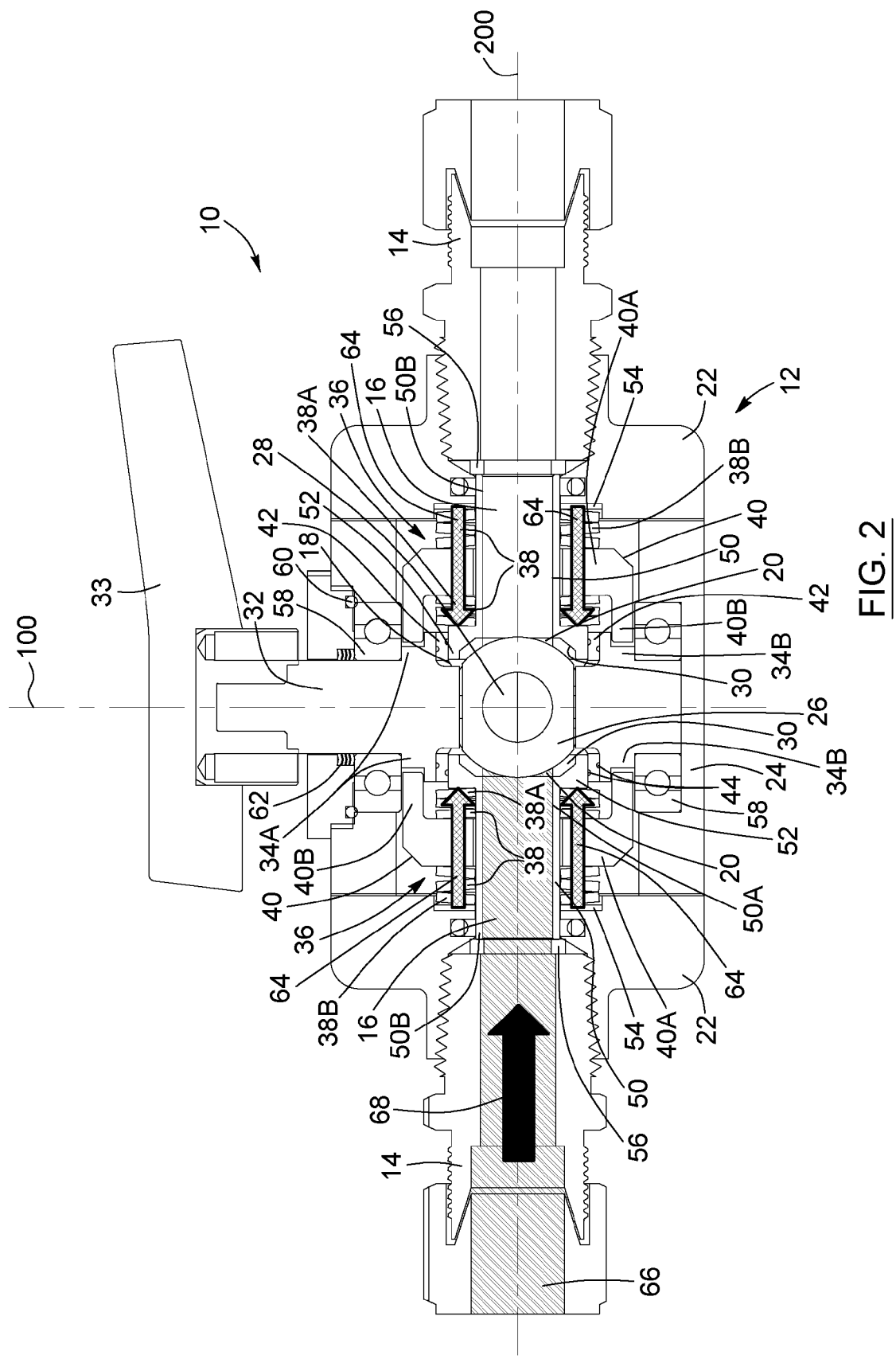
FIG. 2 is a cross-section view of the ball valve of FIG. 1, shown in a closed position.
Figure 3:
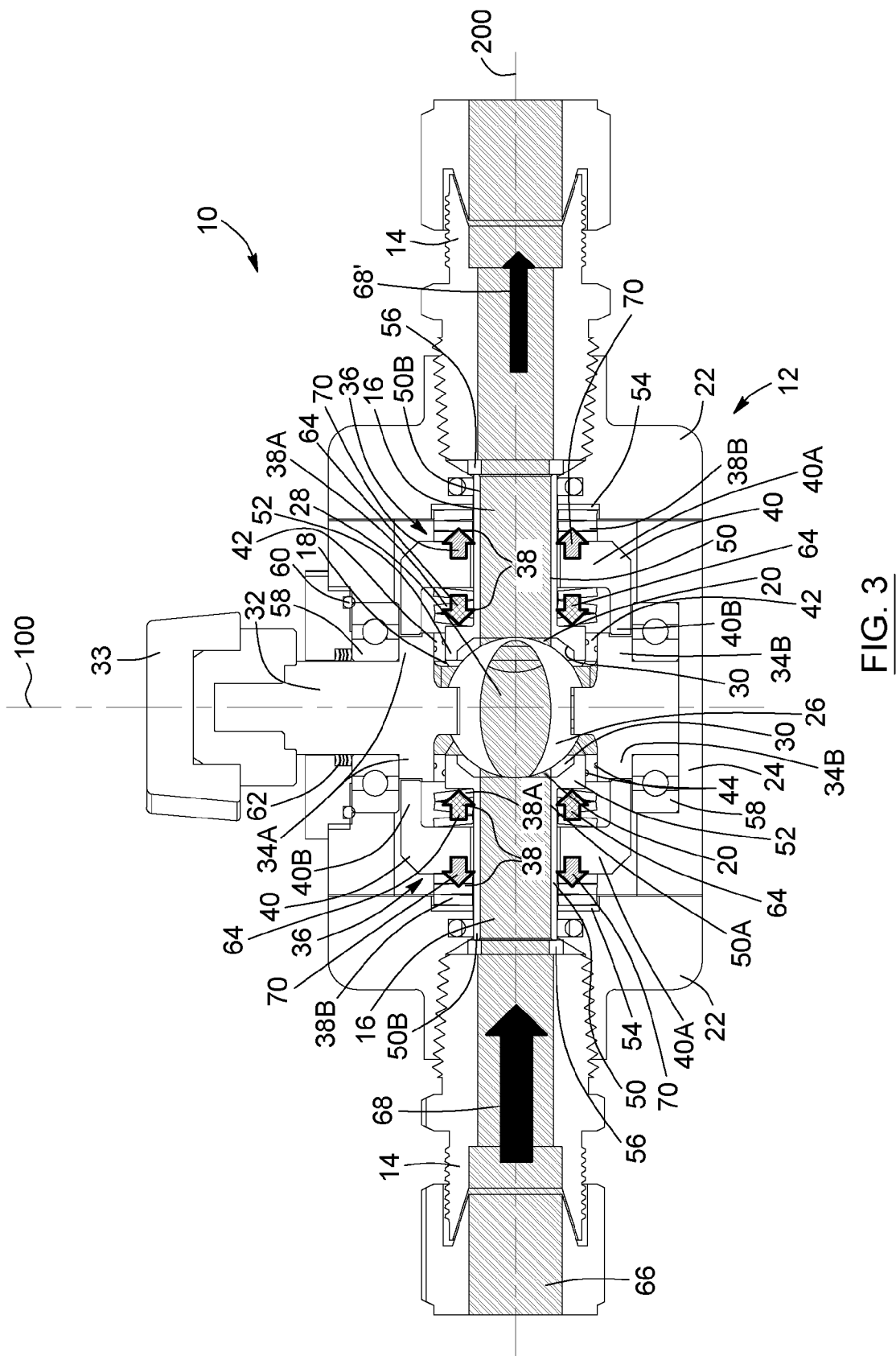
FIG. 3 is a cross-section view of the ball valve of FIG. 1, shown during movement of the ball, the valve being between the closed and the open position.
Figure 4:
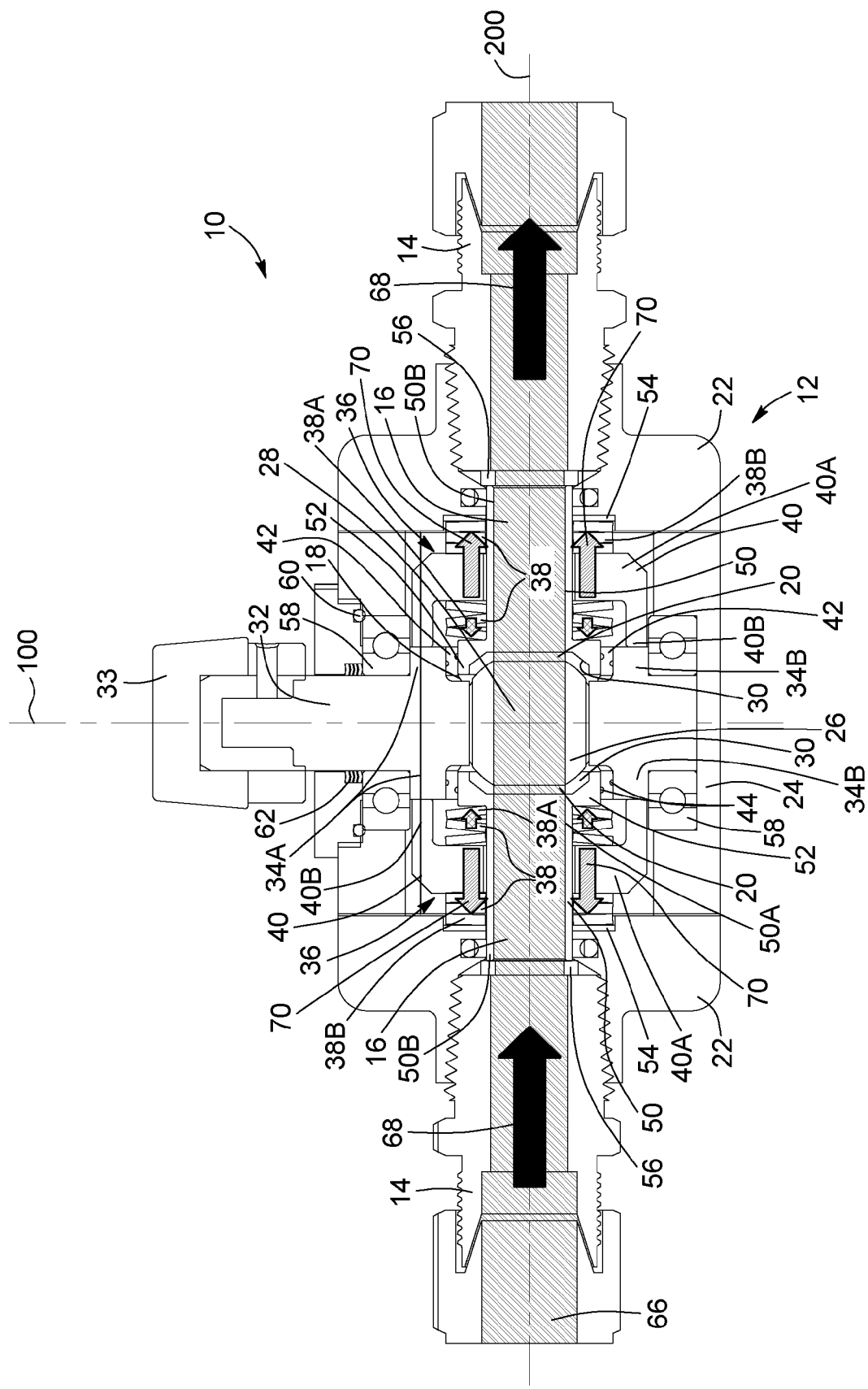
FIG. 4 is a cross-section view of the ball valve of FIG. 1, shown in an open position.

Now referring to FIGS. 2, 3 and 4, there is provided a method for channeling a fluid through a valve. The method helps reducing friction between the ball 26 and the static body assembly 12 of the valve. When the 26 is stationary and the valve 10 is in a closed position (as shown in FIG. 2), a first sealing load force, in this case a spring force 64 is applied radially (i.e., parallel to the axis 200) and toward the ball seat seals 30. The valve 10 is actuated and a rotation of the cam 34 is converted into a translation of the movable member 40 such that the biasing member 40 is variably loaded based on the different positions of the ball. The first sealing load force is reduced while moving the valve between the closed and open positions. In some embodiments, the first sealing load force 64 is a maximum value of the variable sealing load force—in other words, when the valve is between the closed and the open position, or when the valve is in the open position, the sealing load force 64 which is applied on the ball is lower than the first sealing load force. In some embodiments, the sealing load force applied on the ball 26 when the valve is in the open position is at a minimum value. In other words, the sealing load force is at a first sealing load force value when the valve is in the closed position, and decreases when the valve is actuated to reach the minimum value when the valve is in the open position. It is understood that the minimum value of the sealing load force depends on the application and size of the valve. It is also understood that the minimum value is typically chosen such that wear of the ball during actuation of the valve is substantially reduced. In some embodiments, the first sealing load force is applied from both ball seat seals 30, toward the ball.

Referring to FIG. 2, the valve 10 is in the closed position and the flow of fluid 68 is stopped by the ball 26, as the through passage 28 is orthogonal to the fluid passages 16. The minor axes of both cam elements 34A, 34B are parallel to axis 200 (i.e., parallel to the direction of the fluid), and each one of the two movable members 40 is compressing a respective spring assembly 38A, resulting in two opposite sealing load forces 64 being applied toward the ball 26 from opposite sides of the ball 26, in order to seal the valve 10.

Referring now to FIG. 3, the valve 10 is in an intermediate position between a closed position and an open position (i.e., a throttled position). The rotation of the actuating mechanism 32 causes rotation of the first and second cam elements 34A, 34B operationally linked thereto. The rotation of the first and second cam elements 34A, 34B then induces a translation of each one of the movable members 40 away from the ball 26. As a result, a cam force 70 compressing the spring assemblies 38B is gradually increased as the valve 10 opens. The cam force 70 is applied radially and away from the ball seat seals 30. Similarly, the spring assemblies 38A are gradually stretched or decompressed as the valve 10 opens. The cam force 70 varies from a minimum cam force 70 when the valve 10 is in the closed position to a maximum cam force 70 when the valve 10 is in the open position. Similarly, the variable sealing load force, or spring force 64 varies from a maximum sealing load force when the valve 10 is in the closed position to a minimum sealing load force when the valve is in the open position. The fluid 66 entering a first one of the fluid passages 16 at a flow rate 68 starts passing through the through channel 28 of the ball 26 and through a second one of the fluid passages 16 before exiting the valve 10. As the valve opens, the flow rate 68' of the fluid in the second fluid passage 16 increases.

Referring now to FIG. 4, the valve 10 is in the open position. The spring force 64 applied radially and toward the ball seat seal 30, from both sides of the ball 26, is at its minimum value, while the cam force 70 applied radially and away from the ball seat seal 30 is at its maximum value. The spring assemblies 38B are therefore compressed and spring assemblies 38A are stretched. The fluid 66 entering the first fluid passage 16 passes through the through channel of the ball 24 and into the second fluid passage 16 at a substantially constant flow rate 68.

Now referring to FIGS. 10, 10A, 11, 11A, 12 and 12A, the ball seat seals 30 are pressed against the ball 26 with a sealing load force when the valve is in the closed position. In some embodiments, actuating the valve includes creating a gap 72 between the ball 26 and at least one of the ball seat seals 30. The gap 72 is created by rotation of the actuating mechanism 32, which pushes at least one of the tubular members 50 away from the ball 26. In the embodiment shown in the Figures, two gaps 72 are created (one on the left side of FIG. 11A, and one on the right side of FIG. 11A), as both tubular members 50 are pushed away from the ball 26.

In some embodiments, there is provided a method for operating a ball valve. The method includes determining a sealing load force sufficient to substantially seal the valve. It is understood that by "sufficient to substantially seal the valve", it is meant that the sealing load force applied is high enough to allow for normal operation of the valve. The method further includes, when the valve is in the closed position, applying a first sealing load force which is about 3 to 10 times greater than the sealing load force sufficient to substantially seal the valve. The high value of the first sealing load force ensures that the valve is further protected against leaks. This increased leak protection can be useful, for example when the valve is used to handle corrosive or otherwise dangerous materials.

In some embodiments, the method further includes applying a second sealing load force to the ball when the valve is between the open and the closed position, the second sealing load force being lower than the sealing load force sufficient to substantially seal the valve. This ensures that the sealing load force applied to the ball during actuation of the valve helps reducing wear damage which is typically caused to the ball during actuation.

In some embodiments, when the valve is in the open position, the sealing load force applied is a sealing load force lower than the sealing load force sufficient to substantially seal the valve, similarly to the sealing load force applied during actuation of the valve.

In other embodiments, when the valve is in the open position, the sealing load force applied is the first sealing load force. In such case, the cam can have a profile such that the first sealing load force is reduced during actuation of the valve until a minimal value is reached, and the sealing load force is then increased back up to the first sealing load force value, which is attained when the valve is in the open position.

It is appreciated that features of one of the above described embodiments can be combined with the other embodiments or alternative thereof.

Moreover, although the embodiments of the valve and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the valve, as it will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A method for channeling a fluid through a ball valve, comprising:
   a) providing the valve comprising:
      a static body assembly provided with fluid passages for circulating fluid therein in a direction at a fluid pressure, the static body assembly having a cavity, the fluid passages having respective ports opening in said cavity;
      a ball having a through channel and an outer surface, the ball being mounted within the cavity and being rotatable about an axis of rotation orthogonal to said direction of the fluid, between a closed position and an open position so as to obstruct or permit communication between the fluid passages via the through channel;
      ball seat seals interfacing with the outer surface of the ball, each one of the ball seat seals being provided between the ball and the static body assembly, and surrounding a respective one of the ports;
      an actuating mechanism operatively connected to the ball for moving the ball between the open and closed positions;
      a cam operatively connected to the actuating mechanism and rotatable therewith; and
      at least one load varying mechanism provided in the static body assembly, comprising:
         a biasing member pressing one of the ball seat seals against the outer surface of the ball with a variable sealing load force applied on the ball, toward the ball and coaxial with said direction; and
         a movable member operatively connected to the cam and to the biasing member;
   b) applying a first sealing load force on the ball and one of the ball seal seals, coaxially to said direction when the valve is in the closed position;
   c) actuating the valve, wherein the actuating comprises:
      converting a rotation of the cam into a translation of the movable member such that the biasing member is variably loaded based on the different positions of the ball; and
      reducing the first sealing load force applied toward the ball and the ball seal seals while moving the valve between the closed and open positions.

2. The method of claim 1, wherein the first sealing load force is a maximum value of the variable sealing load force.

3. The method of claim 1, further comprising applying a second sealing load force on the ball, coaxially to said direction when the valve is in the open position.

4. The method of claim 3, wherein the second sealing load force is a minimum value of the variable sealing load force.

5. The method of claim 1, wherein the first sealing load force is about 3 to 10 times greater than a predetermined sealing load force sufficient to substantially seal the valve.

6. The method of claim 1, wherein the first sealing load force is applied from both ball seat seals, toward the ball.

7. The method of claim 3, wherein the second sealing load force is applied from both ball seat seals, toward the ball.

8. The method of claim 1, wherein the actuating of the valve further comprises creating a gap between the ball seat seals and the ball while moving the ball between the closed and the open positions.

9. A method for operating a ball valve, comprising:
   a) providing the valve comprising:
      a static body assembly provided with fluid passages for circulating fluid therein in a direction at a fluid pressure, the static body assembly having a cavity, the fluid passages having respective ports opening in said cavity;

a ball having a through channel and an outer surface, the ball being mounted within the cavity and being rotatable about an axis of rotation orthogonal to said direction of the fluid, between a closed position and an open position so as to obstruct or permit communication between the fluid passages via the through channel;

ball seat seals interfacing with the outer surface of the ball, each one of the ball seat seals being provided between the ball and the static body assembly, and surrounding a respective one of the ports;

an actuating mechanism operatively connected to the ball for moving the ball between the open and closed positions;

a cam operatively connected to the actuating mechanism and rotatable therewith; and at least one load varying mechanism provided in the static body assembly, comprising:
- a biasing member pressing one of the ball seat seals against the outer surface of the ball with a variable sealing load force applied on the ball and one of the ball seal seals, toward the ball and coaxial with said direction; and
- a movable member operatively connected to the cam and to the biasing member;

b) determining a sealing load force sufficient to substantially seal the valve;

c) applying a first sealing load force being about 3 to 10 times greater than the sealing load force sufficient to substantially seal the valve, when the valve is in the closed position; and d) actuating the valve, wherein the actuating comprises applying a second sealing load force to the ball when the valve is between the open and closed positions, the second sealing load force being lower than the sealing load force sufficient to substantially seal the valve.

10. The method of claim 9, wherein the first and second sealing load forces are applied on both ball seat seals, toward the ball.

11. The method of claim 9, wherein the actuating of the valve further comprises creating a gap between the ball seat seals and the ball while moving the ball between the closed and the open positions.

12. A ball valve comprising:
a static body assembly provided with fluid passages for circulating fluid therein in a direction at a fluid pressure, the static body assembly having a cavity, the fluid passages having respective ports opening in said cavity;

a ball having a through channel and an outer surface, the ball being mounted within the cavity and being rotatable about an axis of rotation orthogonal to said direction of the fluid, between a closed position and an open position so as to obstruct or permit communication between the fluid passages via the through channel;

ball seat seals interfacing with the outer surface of the ball, each one of the ball seat seals being provided between the ball and the static body assembly, and surrounding a respective one of the ports;

an actuating mechanism operatively connected to the ball for moving the ball between the open and closed positions;

a cam operatively connected to the actuating mechanism and rotatable therewith; and at least one load varying mechanism provided in the static body assembly, comprising:
a biasing member pressing one of the ball seat seals against the outer surface of the ball with a variable sealing load force applied on the ball, toward the ball and coaxial with said direction; and a movable member operatively connected to the cam and to the biasing member, a rotation of the cam translating the movable member coaxially to said direction, variably loading the biasing member toward or away from the ball and the ball seal seals, based on the different positions of the ball.

13. The valve of claim 12, wherein the biasing member comprises at least one spring assembly provided around one of the fluid passages.

14. The valve of claim 13, comprising tubular members defining at least partially the respective the fluid passages, the tubular members having respective opposite inner and outer ends, the inner ends facing the ball, at least one of said tubular members comprising a flange extending outwardly at or near the inner end of said tubular member.

15. The valve of claim 14, wherein the static body assembly comprises a sidewall defining at least partially the cavity housing the ball, said at least one spring assembly being located between said sidewall of the static body assembly and said flange of one of the tubular members.

16. The valve of claim 15, wherein said at least one spring assembly comprises a second spring assembly located between the movable member and said flange of one of the tubular members.

17. The valve of claim 14, wherein the movable member comprises one of the tubular members.

18. The valve of claim 14, wherein the flange has an inner side facing the ball and an outer side opposite to the inner side, the biasing member abutting the outer side of the flange, the biasing member being variably loaded toward or away from the ball based on the variable force applied on the outer side of the flange via the cam and the movable member.

19. The valve of claim 12, wherein the movable member comprises:
a first portion surrounding the first fluid passage and slidable thereon, the first portion extending orthogonally to said direction and pressing the biasing member; and a second portion extending from an end of the first portion, coaxially to said direction, and linked to the cam.

20. The valve of claim 19, wherein the first portion is a plate provided with a hole mating the first fluid passage and the second portion is a wing extending from the plate.

21. The valve of claim 12, wherein the cam comprises a first cam element located at the top of the ball, proximate to a connection of the actuating mechanism with the ball.

22. The valve of claim 21, wherein the cam further comprises a second cam element located at the bottom of the ball and operatively connected thereto.

23. The valve of claim 12, wherein the actuating mechanism comprises a shaft rotatable about the axis of rotation, substantially orthogonal to said direction.

24. The valve of claim 22, wherein the cam is integrally formed or connected to the shaft.

25. The valve of claim 12, wherein the cam comprises a major axis and a minor axis, and wherein:
the valve is in the closed position when the minor axis of the cam is coaxial with said direction of the fluid; and
the valve is in the open position when the major axis of the cam is coaxial with said direction of the fluid.

26. The valve of claim 12, wherein said at least one load varying mechanism comprises a first and second load varying mechanism, said first and second load varying mechanism comprising respective first and second biasing members for respectively pressing a first and a second one of the ball seat seals against the outer surface of the ball, and respective first and second movable members operatively connected to the cam and to the first and second biasing members, respectively.

27. The valve of claim 12, wherein the ball has an ellipsoid-like shape with the through channel being provided along a minor axis, the ball acting as the cam.

* * * * *